(12) United States Patent
Birakoglu et al.

(10) Patent No.: US 8,429,459 B2
(45) Date of Patent: Apr. 23, 2013

(54) USE OF ATTRIBUTE SETS FOR TEST ENTITY IDENTIFICATION DURING SOFTWARE TESTING

(75) Inventors: Suekrue Birakoglu, Juan les Pins (FR); Roman Rapp, Villeneuve Loubet (FR)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/845,367

(22) Filed: Jul. 28, 2010

(65) Prior Publication Data
US 2012/0030515 A1   Feb. 2, 2012

(51) Int. Cl.
*G06F 11/00* (2006.01)
(52) U.S. Cl.
USPC .................................... 714/38.1; 717/124
(58) Field of Classification Search .................. None
See application file for complete search history.

(56) References Cited

U.S. PATENT DOCUMENTS

| | | | |
|---|---|---|---|
| 5,157,779 A * | 10/1992 | Washburn et al. | 714/37 |
| 6,286,131 B1 * | 9/2001 | Beers et al. | 717/125 |
| 7,028,290 B2 * | 4/2006 | Srivastava et al. | 717/124 |
| 2003/0204836 A1 | 10/2003 | Srivastava et al. | |
| 2004/0220774 A1 * | 11/2004 | Agarwal et al. | 702/183 |
| 2008/0320462 A1 * | 12/2008 | Bergman et al. | 717/168 |
| 2009/0217303 A1 * | 8/2009 | Grechanik et al. | 719/320 |
| 2009/0288070 A1 * | 11/2009 | Cohen et al. | 717/125 |

OTHER PUBLICATIONS

Qing Xie, Mark Grechanik, and Chen Fu, Reducing Effort in Script-Based Testing, IEEE, 2008, 468-469.*
Mark Grechanik, Qing Xie, and Chen Fu, Reducing Effort in Script-Based Testing, Nov. 11, 2007, 1-8.*
Extended European Search Report for EP Application No. 11005877.3, mailed Oct. 20, 2011, 7 pages.

* cited by examiner

*Primary Examiner* — Scott Baderman
*Assistant Examiner* — Jason Bryan
(74) *Attorney, Agent, or Firm* — Brake Hughes Bellermann LLP

(57) ABSTRACT

An attribute collector may collect an attribute set for each test entity of a plurality of test entities associated with a software test executed in a software environment. An attribute analysis signal handler may receive an attribute analysis signal associated with a change in the software environment, and a view generator may provide an attribute-based view associated with an affected attribute set associated with the change, the attribute-based view identifying an affected test entity that is affected by the change.

17 Claims, 12 Drawing Sheets

USE OF ATTRIBUTE SETS FOR TEST ENTITY IDENTIFICATION DURING SOFTWARE TESTING

TECHNICAL FIELD

This description relates to software testing.

BACKGROUND

Software frequently requires testing in order to ensure that proper, desired, and complete functionality is being provided by the software. For example, it is common to test software during an installation or upgrade of the software, or when re-configuring, patching, or activating the software.

Automated software tests may be performed in order to test software in a fast, efficient, and cost-effective manner. For example, for software to be tested, known software inputs may be determined in conjunction with expected software outputs. Then, the known software inputs may be input into the software, and the actual software outputs may be compared against the expected software outputs, in order to test a correctness and stability of the software, and to identify potential malfunctioning aspects of the software.

However, in many cases, changes in the software to be tested, including the very changes which prompt the testing, may skew a result of the testing, because, e.g., the known software inputs may be partially or wholly invalid with respect to the thus-changed software. For example, if the tested software includes a graphical user interface (GUI) that has been updated to include a new field, but the known software inputs do not reflect the presence of such a new field, then the actual software outputs may include an error message which is not a part of the expected software outputs. Consequently, a software test engineer may erroneously believe that the tested software is malfunctioning. Moreover, even if the software engineer recognizes that the error lies in the testing configuration, e.g., of the software inputs, it may be difficult for the software engineer to correct the testing configuration.

SUMMARY

According to one general aspect, a computer system may include instructions recorded on a non-transitory computer-readable storage medium and readable by at least one processor. The system may include an attribute collector configured to cause the at least one processor to collect an attribute set for each test entity of a plurality of test entities associated with a software test executed in a software environment, an attribute analysis signal handler configured to cause the at least one processor to receive an attribute analysis signal associated with a change in the software environment, and a view generator configured to cause the at least one processor to provide an attribute-based view associated with an affected attribute set associated with the change, the attribute-based view identifying an affected test entity that is affected by the change.

According to another general aspect, a computer-implemented method for causing at least one processor to execute instructions recorded on a computer-readable storage medium may include collecting an attribute set for each test entity of a plurality of test entities associated with a software test executed in a software environment, receiving an attribute analysis signal associated with a change in the software environment, and providing an attribute-based view associated with an affected attribute set associated with the change, the attribute-based view identifying an affected test entity that is affected by the change.

According to another general aspect, a computer program product tangibly embodied on a computer-readable medium may include instructions that, when executed, are configured to cause at least one processor to collect an attribute set for each test entity of a plurality of test entities associated with a software test executed in a software environment, receive an attribute analysis signal associated with a change in the software environment, and provide an attribute-based view associated with an affected attribute set associated with the change, the attribute-based view identifying an affected test entity that is affected by the change.

The details of one or more implementations are set forth in the accompanying drawings and the description below. Other features will be apparent from the description and drawings, and from the claims.

DETAILED DESCRIPTION

Figure 1:
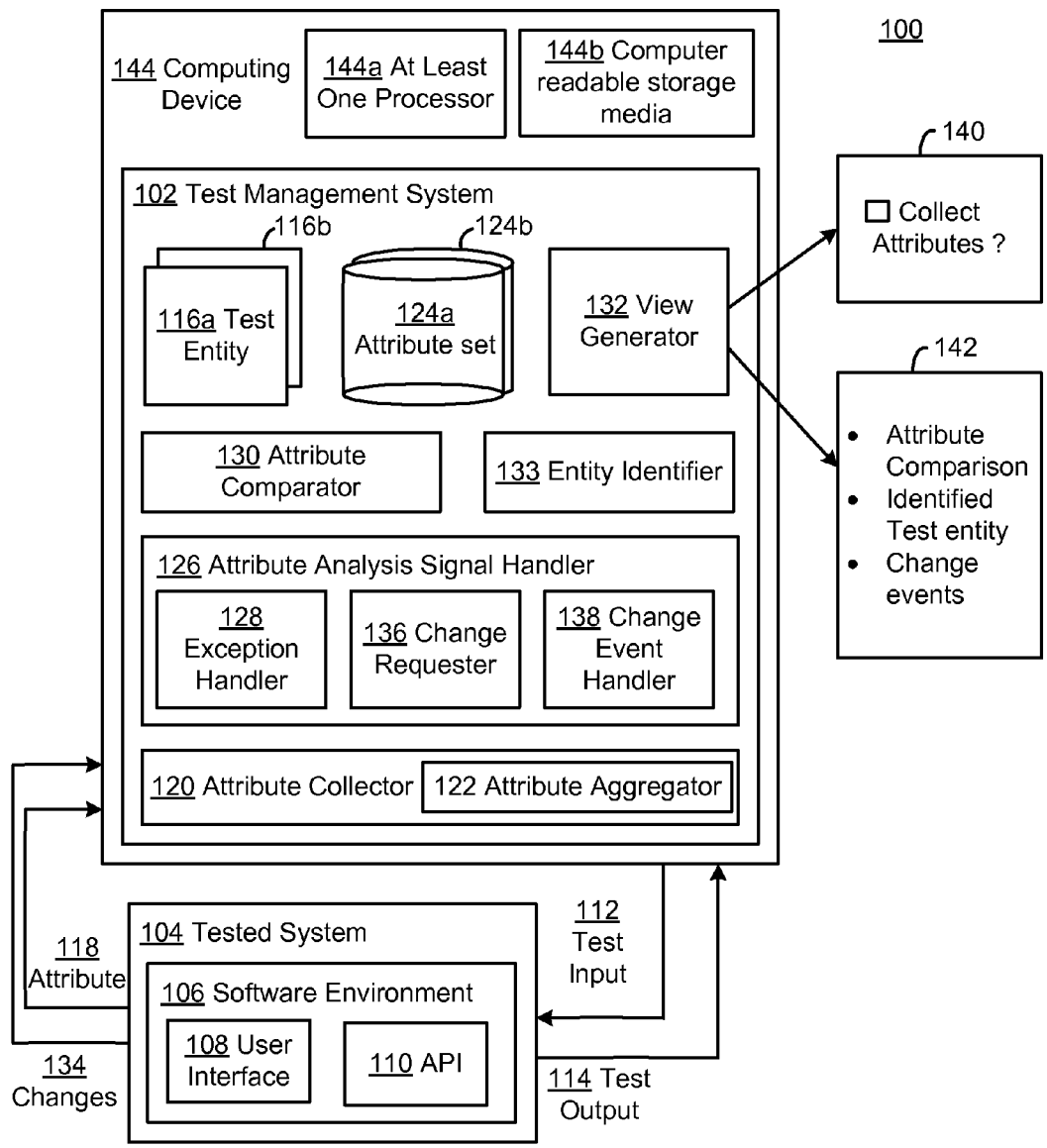
FIG. 1 is a block diagram of a system for identifying software test entities affected by software changes.

FIG. 1 is a block diagram of a system 100 for identifying software test entities affected by software changes. For example, as referenced above, test configurations used for performing automatic testing of software may be affected (e.g., may become inoperable or may provide incorrect outputs) by a change which occurs in the software which is being tested. The system 100 enables a test engineer to easily identify an affected test entity from among a large number affected test entities of a test configuration, with sufficient specificity to facilitate a necessary update or repair of the affected test entity.

In the example of FIG. 1, a test management system 102 is operable to perform automated testing of a tested system 104. As may be appreciated, the test management system 102 may represent virtually any system which may be used to provide automated testing of virtually any tested system 104. For example, the test management system 102 may be a centralized system that is remote from a plurality of tested systems which include the tested system 104. In other implementations, the test management system 102 may be local to the tested system 104. Various test configurations and setups which may be applicable to, or used in conjunction with, the system 100 of FIG. 1 are well known, and are not described here in detail, except as necessary or helpful to understand operations of the system 100.

In FIG. 1, the tested system 104 is illustrated as including a software environment 106. Again, examples of such software environments are well known, and too numerous to mention in any detail. Generally, however, such software environments may include one or more software applications deployed within virtually any user environment, e.g., a corporate user within a business organization, a consumer, or an information technology (IT) professional.

For the sake of example, the software environment 106 of FIG. 1, is illustrated as including a user interface 108, and an application program interface (API) 110. These software components or objects 108, 110 are intended to represent virtually any software application, object, or other entity that may exist or operate within the software environment 106. Thus, the specific examples of the user interface 108, and the API 110, are mentioned merely as general or generic examples which are included to illustrate specific example implementations of the system 100.

As referenced above, testing of the tested system 104 by the test management system 102 may proceed with input of test input data 112 into the software environment 106. For example, a test engineer may wish to use the test management system 102 in order to test an operation or functionality of the user interface 108. The user interface 108 may have a plurality of fields, forms, input/output elements, and various other functionalities known to be implemented by user interfaces. Consequently, the test management system 102 may provide test input data 112 into various input elements of the user interface 108, and may consequently receive test output data 114 associated with outputs of the user interface 108. As is generally known, the test management system 102 may therefore compare the test input data 112 with the test output data 114, using expected test output (not explicitly illustrated in the example of FIG. 1), in order to determine whether the user interface 108 is functioning in a desired manner. Similar comments apply to the API 110 (e.g., appropriate test input data 112 may be input thereto, and subsequently receive test output data 114 may then be prepared against expected output data, in order to judge functionality of the API 110).

Over time, the software environment 106 may undergo various types and extents of changes. For example, components of the software environment 106 (e.g., the user interface 108, or the API 110), may be updated, modified, reinstalled, or otherwise altered during a lifetime of the software environment 106. In further examples, components may be added to, or removed from, the software environment 106 (e.g., the API 110 may be added to the software environment 106 at a point in time). Various other substantial changes to and within the software environment 106 are, by themselves, well known to one of skill in the art, and are therefore are not expressed here in further detail, except as may be necessary or helpful in understanding operations of the system 100.

In executing testing of the software environment 106, the test management system 102 may deploy or otherwise use a plurality of test entities as part of a given test configuration(s), shown in the simplified example of FIG. 1 as conceptually including a test entity 116A and a test entity 116B. In this context, it may be appreciated that various terminology and semantics associated with operation of test management systems within the art may vary among various providers and operators of such test management systems. Therefore, the term "test entity" as used herein is merely intended to represent virtually any discrete software construct which may be used by the test management system 102 to execute some defined function or purpose with respect to performing testing of the testing system 104 (i.e., the software environment 106), e.g., any testing instructions for testing software objects within the software environment. 106

For example, during an example testing of the software environment 106, it may occur that a particular test script is used to define the test input data 112, to receive the test output data 114, and/or to execute a comparison of the actual test output data 114 with expected test output data. Consequently, such test scripts may be considered as examples of whole or partial test entities. Further, a particular testing scenario or test case may include a number of different variants of the same or similar underlying test script. Further, it may occur that the particular test script is configured to call or otherwise utilize one or more additional test scripts, so as to thereby execute a composite test case which includes a hierarchy or other linking of desired test scripts.

In other examples, test entities may be defined by, or with respect to, different versions of the test input data 112, and/or may be defined with respect to different examples of tested systems 104, and/or associated software environments 106. Other uses and contexts of the term test entity, and thus, of the test entity 116A and the test entity 116B shown in the example of FIG. 1, are provided herein in more detail, or would be apparent to one of skill in the art.

In the example of FIG. 1, attributes 118 associated with testing of the software environment 106 in association with the test entities 116A, 116B are collected by an attribute collector 120. For example, during an initial testing of the software environment 106, certain aspects or other attributes existing in association with the software environment 106 during the testing may be retrieved/received by the attribute collector 120, and thereafter grouped or otherwise organized by an attribute aggregator 122.

For example, during a testing of the software environment 106, testing may occur with respect to both the user interface 108 and the API 110. The attributes 118 may thus be collected by the attribute collector 120 and grouped by the attribute aggregator 122 into a first group associated with the user interface 108, and into a second group associated with the API 110.

Of course, this is merely a simplified example, and in additional or alternative implementations, the attribute collector 120 and the attribute aggregator 122 may serve to collect various other types of attributes, and to perform various other types of grouping thereon, respectively. For example, such attributes may include user-specific data such as log-on language, date format, time format, decimal notation, or time zone, or may include names of graphical user interface (GUI) fields (and identification showing whether the field is mandatory or optional), versions of software components, and transaction attributes (e.g., authorization objects assigned to a transaction, the GUI availability of a transaction). Specific additional or alternative examples of such attributes and associated grouping are provided in more detail, below.

In the example of FIG. 1, the attribute collector 120 may store the collected and aggregated attributes within corresponding attribute sets 124A, 124B. More specifically, the attribute sets 124A, 124B may be stored in connection with corresponding test entities 116A, 1116B. For example, the test entity 116A may relate to the user interface 108, and may be stored in association with the attribute set 124A, which is also associated with the user interface 108. Similarly, the test entity 116B and the attribute set 124B may be associated with a testing of the API 110.

As referenced above, over time, changes may occur within the software environment 106. Consequently, in the example of FIG. 1, an attribute analysis signal handler 126 is illustrated which is configured to receive or otherwise determine one or more different types of attribute analysis signals. That is, in general, such signals may be generally understood to represent information which triggers analysis of the attribute sets 124A, 124B, so as to thereby identify a corresponding test entity 116A, 116B which may have been affected by (e.g., rendered in operable by) the intervening change within the software environment 106. By facilitating such an identification of an affected test entity, the test management system 102 allows a test engineer to quickly and efficiently repair or otherwise update the affected test entity, so that testing of the tested system 104 may proceed in a desired manner.

As referenced above, and as illustrated in the example of FIG. 1, the attribute analysis signal handler 126 illustrates several different types of example signals which may trigger or otherwise be associated with analysis of the attribute sets 124A, 124B. For example, the attribute analysis signal handler 126 may include an exception handler 128, which is operable to receive or otherwise identify an exception which occurs during a subsequent testing of the software environment 106.

For example, as referenced above, an initial testing of the software environment 106 may occur, as executed by the test management system 102. Subsequently, a change may occur within the software environment 106, which may affect, e.g., the user interface 108. Consequently, during a second or other subsequent testing of the software environment 106 which occurs after such change has happened, it may occur that the test entity 116A is no longer configured properly to test the updated or otherwise changed functions of the user interface 108. As a result, during such a second or subsequent testing, an exception may occur in which an error message is reported to the test management system and received by the exception handler 128. Of course, virtually any known technique for recognizing or reporting such an error or other exception may be used in variations of the system 100 of FIG. 1.

In the example of FIG. 1, the exception handler 128 may thus receive an exception notifier which serves as an example of the attribute analysis signal. That is, it may be appreciated that the attribute collector 120 and the attribute aggregator 122 may be configured to perform their respective functionalities during each testing of the software environment 126, e.g., during an initial testing as well as a second or other subsequent testing. Therefore, after detection of an error or other exception within the second or other subsequent testing, a first version of the attribute set 124A may be compared associated with the initial testing may thereafter be compared with a second version of the attribute set 124A which is associated with the second or other subsequent testing.

More specifically, an attribute comparator 130 may be configured to retrieve the first version of the attribute set 124A associated with the initial testing, and to receive the second version of the attribute set 124A associated with the second or subsequent testing (or whatever partial portion thereof was able to be collected prior to the occurrence of the exception). A view generator 132 may thereafter be configured to output the two versions of the attribute set 124A, whereupon the test engineer may easily be able to determine particular attributes which were affected by the intervening change in software environment 106. Consequently, the test engineer may thereafter be enabled to identify and repair the associated test entity 116A which is associated with the identified (i.e., affected) attributes.

Of course, it may be appreciated that the above example represents an extremely simplified scenario in which only a minimal number or amount of test entities, attributes, attribute sets, and software entities are included. In more general or realistic examples, it may be appreciated that a large number of attributes may be collected, and that a similarly large number of test entities may be present within the test management system 102. Nonetheless, by collecting the attributes 118 into the grouped attribute sets 124 as described herein, the attribute comparator 130 may be able to provide a convenient comparison of the collected attributes, in a manner which facilitates identification of the objects or other elements of the software environment 106 which were affected by the intervening change within the software environment, so that, as a result, a corresponding test entity may itself also be quickly and efficiently identified.

In specific examples, the view generator 132 may simply provide the different versions of the attribute set(s) in alignment with one another, for identification of the test entity therefrom by the test engineer. In other examples, the attribute comparator 130 may be operable to provide, in conjunction with the view generator 132, a view of only those attributes which are candidates for being associated with the change in an underlying element of the software environment 106 and/or with a corresponding test entity. In still further environments, as described in detail below, an entity identifier 133 may be configured to actually output a specific identification of one or more of the test entities 116 affected by the intervening change in software environment 106.

In the example of the exception handler 128, it may occur that the software environment 106 experiences a change, and that, as described, a test engineer does not become aware of the change until a subsequent time at which the change affects a corresponding subsequent testing of the software environment 106. In other example implementations, however, the test management system 102 may be configured to receive, detect, or otherwise determine such changes, at a time of occurrence of the changes. Consequently, the test management system 102 may be configured to identify affected test entities, and execute any corresponding repairs thereof, potentially before commencement of any subsequent testing. As a result, the test management system 102 may minimize or avoid (i.e., preempt) testing stoppages associated with exceptions caused by such intervening changes.

In the example of FIG. 1, changes 134 are illustrated as being received from the software environment 106. More specifically, the changes 134 may be determined with respect to the software environment 106 by the attribute analysis signal handler 126 in a variety of different manners. For example, it may occur that a change requestor 136 is used which is operable to poll the software environment 106, e.g., periodically or at a request of the test engineer, so as to obtain the changes 134 from the software environment 106. For example, the test engineer may perform an initial testing of the software environment 106 at a first time. After a period of time, the change requestor 136 may automatically, or at a request of the test engineer, request any intervening changes 134 from the software environment 106. In another example, the test engineer may specifically become aware of a change that has occurred with respect to the software environment (e.g., an update or other modification thereof), and may utilize the change requestor 136 to request a detailed listing of the changes 134 in response thereto.

In additional or alternative implementations, a change event handler 138 may be configured to receive changes 134 in response to, or in conjunction with, publication or other transmission of the changes 134 by the software environment 106 and/or the testing system 104. For example, as described in detail below with respect to FIG. 3, the testing system 104 and/or the software environment 106 may include a change event generator, publisher, or other transmitter (not specifically illustrated in the example of FIG. 1), which is operable to detect and transmit the changes 134, as such changes occur in conjunction with the software environment 106. For example, in response to an installation, upgrade, update, maintenance, or other change associated with the software environment 106, such change event generation may occur within the testing system 104 to publish a detailed listing of such changes 134.

Thus, in the above examples, and in other example implementations, it may occur that the attribute analysis signal handler 126 uses the attribute analysis signal in the form of the changes 134 which are received from the testing system 104. The attribute comparator 130 and/or the entity identifier 133 may thereafter analyze the changes 134 with respect to the attribute sets 124A, 124B, to ultimately identify an appropriate test entity of the test entities 116A, 116B that may be affected by the changes 134. In this way, it is apparent that the test engineer may become aware of affected test entities which may need to be repaired, replaced, updated, or otherwise modified in order to ensure a complete and correct testing of the software environment 106 in the future.

In the example of FIG. 1, the view generator 132 is illustrated as providing example views 140, 142 which may be viewed by the test engineer in utilizing the test management system 102. For example, such views may correspond to graphical user interfaces, e.g., within an appropriate browser or other user interface tool, which thereby provides the test engineer with the ability to execute, and benefit from, the various functionalities of the test management system 102 as described herein.

In particular, as referenced above, the test management system 102 is configured to collect attribute sets 124A, 124B in conjunction with testing of the software environment 106 by corresponding test entities 116A, 116B. At a beginning of such test scenarios, the test engineer may be presented with the view 140 which includes a check box allowing the test engineer to indicate whether it is necessary for a test management system 102 to collect attributes during the upcoming testing of the software environment 106. Of course, the view 140 may include many and various other aspects and functionalities associated with designing and executing such tests of the software environment 106. In the simplified example of FIG. 1, however, the view 140 merely illustrates that the test engineer is in control of whether, when, how, and to what extent attributes may be collected during the testing.

For example, the test engineer may use the view 140 to collect attributes during an initial testing of the software environment 106, but may not necessarily collect such attributes during subsequent testing, unless and until the changes 134 are detected. At that time, the test engineer may execute a subsequent test during which attributes may be collected for use by the attribute comparator 130 and the entity identifier 133 in identifying any and all affected test entities. Similarly, the view 140 may be used to collect attributes during a testing which occurs in conjunction with or after detection of an exception that occurs during testing of the software environment 106 (e.g., as detected by the exception handler 128).

Meanwhile, the view 142 is intended to conceptually represent the various types and combinations of outputs which may be provided, e.g., by the attribute comparator 130 and/or the entity identifier 133. For example, as shown in the view 142, and as described above, the view generator 132 may output an attribute comparison which compares collected attributes during two separate or independent testings of the software environment 106, where it may be appreciated that the second testing occurs after an occurrence of at least one change to or within the software environment 106. In this way, as described, the test engineer may view such an attribute comparison and determine affected attributes, for use and thereby ultimately identifying corresponding affected test entities.

In addition to, or as an alternative to, the output of such output comparisons, the view 142 may simply include a list of potential identified test entities, as determined by the entity identifier 133. That is, such identified test entities may be provided in response to any of the various examples of the attribute analysis signals described above, or combinations thereof.

Finally with respect to the view 142, as shown, the view generator 132 may include specific reference to, or description of the change events associated with the changes 134 of the software environment 106. As may be appreciated, such change events may be correlated with, e.g., shown in conjunction with, corresponding attributes and/or affected test entities. In this way, the test engineer may easily visualize or otherwise determine a connection between the specific changes 134 that have occurred and their affect on one or more test entities of the test management system 102.

As referenced above, it may be appreciated that the system 100 of FIG. 1 is intended to illustrate a simplified example which provides a number of possible example implementations of test management systems in which affected test entities may be identified in a fast, accurate, and efficient manner. It may be further appreciated that various standard components and functionalities of the system 100, and various instances thereof, are not necessarily illustrated or described in detail in the simplified example of FIG. 1, but would be apparent to one of skill in the art.

For example, the test management system 102 may be executed using a computing device 144 that includes at least one processor 144A which is operable to read instructions from a computer readable storage media 144B, for use in implementing the test management system 102. For example, as referenced above, the computing device 144 may represent one or more server computers which are centralized with respect to a plurality of tested systems, such as the testing system 104, within a business or other organization. Of course, similar comments apply to the tested system 104 itself. In fact, the tested system 104 may be executed at least partially using resources of the computing device 144 itself, or using resources of a separate computing device on which the tested system 104 exists and is operated.

Since the computing device 144 is intended to represent one of a potential plurality of computing devices that may be used to implement the test management system 102, it may be appreciated that elements of the test management system 102 may in fact be executed using different computers. For example, data associated with the test management system 102 may be stored in whole or in part on a separate computing device from the various functional blocks illustrated in the example of FIG. 1. Conversely, although elements of the test management system 102 are illustrated separately from one another in the simplified example of FIG. 1 for the sake of illustration and explanation, it may occur that various ones of such functional elements may have overlapping functionality, and/or may be implemented together within the test management system 102.

Inasmuch as various elements of the test management system 102 are described as communicating with the testing system 104, e.g., the software environment 106, it may be appreciated that such communication may occur by way of appropriate corresponding computer interfaces, which facilitate message exchange, including associated protocol and format considerations, between the test management system 102 and the testing system 104. As such, such interfaces may be considered to exist in whole or in part within a testing system 104 itself, as shown, for example, in the examples of FIGS. 3 and 4, below (and as discussed in detail therein).

Figure 2:
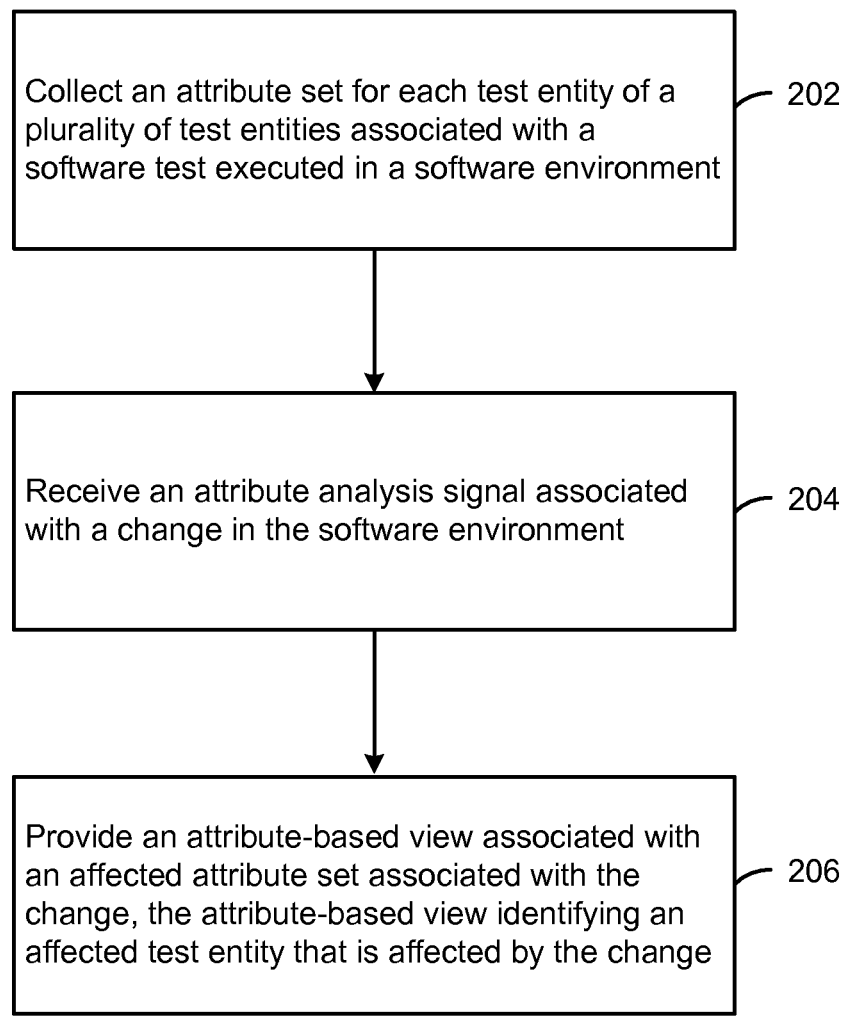
FIG. 2 is a flowchart illustrating example operations of the system of FIG. 1.

FIG. 2 is a flowchart 200 illustrating example operations of the system 100 of FIG. 1. In the example of FIG. 2, operations 202-206 are illustrated in consecutive and sequential order. However, it may be appreciated that such illustration merely represents a non-limiting example of possible operations of the system 100. For example, additional or alternative operations may be included, as described herein. Further, the various operations 202-206, are related applications or operations, may occur in a partially or wholly overlapping fashion, in parallel, or in a different order than that shown.

In FIG. 2, an attribute set is collected for each test entity of a plurality of test entities associated with the software test executed in the software environment (202). For example, the attribute collector 120, e.g., using the attribute aggregator 122, may collect the attributes 118 from the tested system 104 in conjunction with the testing of the software environment 106. As described, the attributes 118 may thus be grouped into attribute sets 124A, 124B, which correspond to related test entities 116A, 116B. As also described, the attribute sets 124A, 124B may be grouped by the attribute aggregator 122 so as to correspond to various specific aspects, e.g., objects or software objects, of the software environment 106, such as the user interface 108 or the API 110.

An attribute analysis signal associated with the change in the software environment may be received (204). For example, the attribute analysis signal handler 126 may receive one or more of the various attribute analysis signals described above, which reflect, describe, or otherwise present the existence of changes 134 that have occurred with respect to the software environment 106 since the time of the collecting of the various attribute sets. For example, the attribute analysis signal indicating the presence of the changes 134 may be received or otherwise determined in conjunction with errors or other exceptions that occur in conjunction with subsequent testing of the software environment 106 which occur after the changes 134. In other examples, as described, the changes 134 may be requested from, or otherwise received from, the software environment 106, e.g., at a time subsequent to an initial testing of the software environment 106 but potentially prior to a time of a subsequent testing of the software environment 106.

An attribute based view associated with an affected attribute set associated with the change may be provided, where the attribute based view identifies an affected test entity that is affected by the change (206). For example, the attribute comparator 130 and/or the entity identifier 133 may be configured to utilize the collected attributes associated with one or more testings of the software environment 106, perhaps in conjunction with information regarding the changes 134, to thereby enable the view generator 132 to output the view 142 which, as described, provides various attribute based views which allow the test engineer to directly or indirectly determine the affected test entity of the plurality of test entities. For example, as described, the attribute based view 142 may simply include a direct listing for a comparison of various attribute sets, or affected attributes thereof, so that the test engineer may easily deduce or infer affected test entities therefrom. In these or related examples, the entity identifier 133 may directly output a specific identification of an affected test entity, (e.g., the test entity 116A or 116B), perhaps in conjunction with specific identification of corresponding ones of the changes 134 which enabled identification of the affected test entity.

Figure 3:
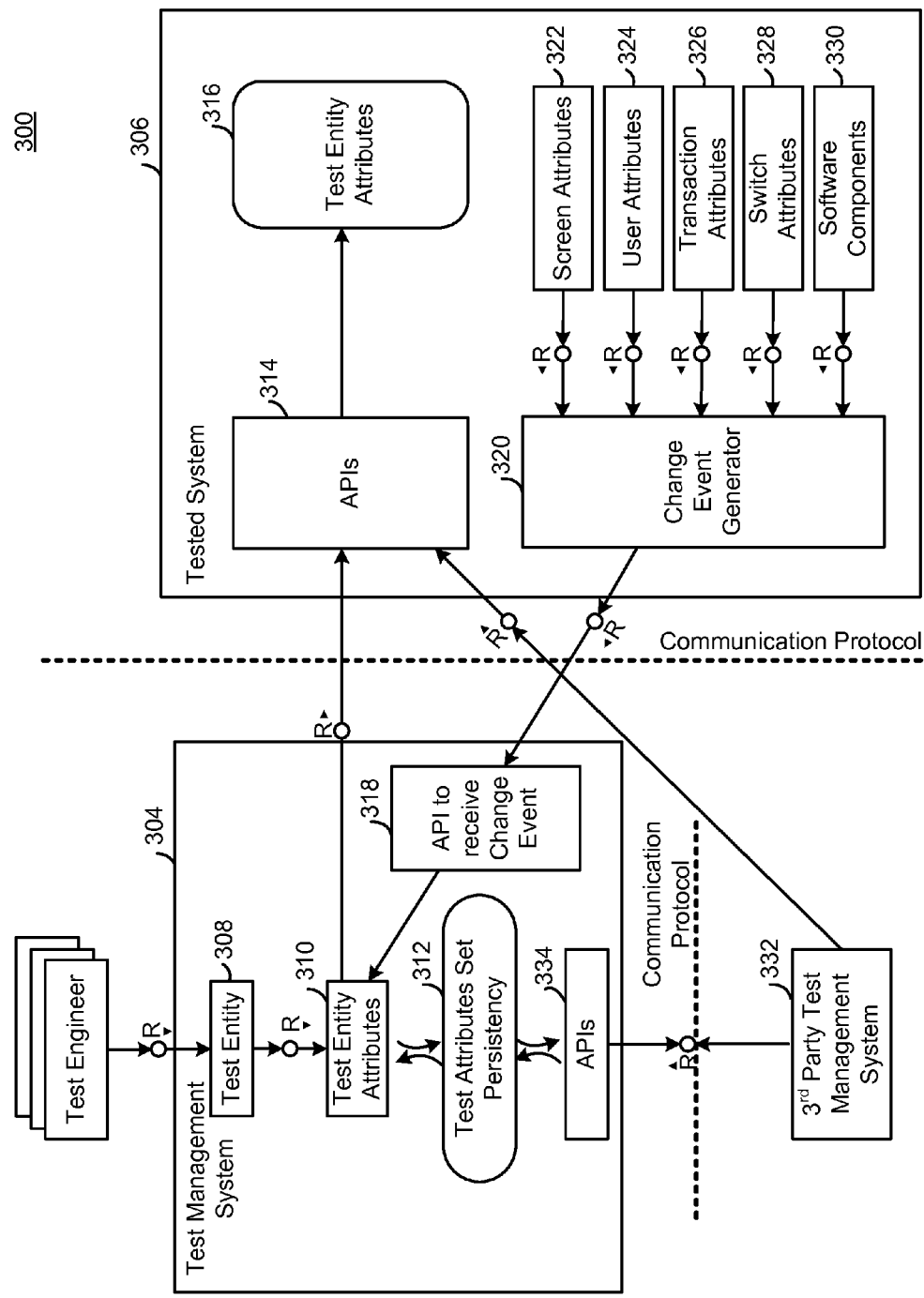
FIG. 3 is a block diagram of a system illustrating a first example implementation of the system of FIG. 1.

FIG. 3 is a block diagram of a system 300 illustrating a first example implementation of the system 100 of FIG. 1. More specifically, as referenced above and as described in more detail below, the system 300 illustrates an example implementation of the system 100 in which the attribute analysis signal handler 126 utilizes the change event handler 138 in identifying affected test entities.

Thus, in the example of FIG. 3, a test engineer 302 interacts with a test management system 304 in order to perform software testing on a tested system 306. As described above, various test entities, e.g., a test entity 308, may be associated with corresponding test entity attributes 310 which may be persistent as test attribute sets 312.

During testing of the tested system 306, API's 314 may be installed locally to detect the system 306 in order to collect or otherwise determine test entity attributes 316. In other words, with reference to FIG. 1, FIG. 3 illustrates explicitly that portions of the functions of the attribute collector 120, or related functions, may be partially or wholly executed in association with the environment of the tested system 306. Thus, for example, the results of an initial test case implemented to perform testing of the tested system 306 may include the various test entity attributes 316, which may be stored as the test attribute sets 312, as described above.

At a later time which is subsequent to such testing of the tested system 306, it may occur that one or more changes occur within the tested system 306. In such cases, an API 318 to receive associated change events may be included within the test management system 304 and may communicate with a corresponding change event generator 320 installed locally to the tested system 306. In other words, such generated change events may correspond to the attribute analysis signal described above, and the API 318 and change event generator 320 may correspond in whole or in part to the change event handler 138 in the example of FIG. 1.

FIG. 3 provides some additional, non-limiting examples of such changes, with respect to various system attributes and components 322-330 which may exist in the tested system 306. As shown in FIG. 3, and as referenced above, change events may be related to screen attributes 322 associated with the user interface of the tested system 306. For example, various user interface fields may be added to, deleted from, or otherwise modified with respect to, a particular user interface. In other examples, functionalities of existing fields or other elements of the user interface may be altered. In a further example, user attributes 324 may correspond to attributes of an attribute set, and also may serve as a source of changes generated by the change event generator 320. For example, such user attributes 324 may include user profile information, such as a role or title of a user, or an authorization level of a particular user, or virtually any other aspect which describes a user of the tested system.

Further, transaction attributes 326 may relate to virtually any transaction that may occur in association with the tested system 306. For example, a user may be tasked with executing certain financial transactions, which may include exchange of associated financial documents. In such examples, it may occur that a financial document associated with a transaction may initially be associated with, or require, a first authorization level of a user, but at a later time, may be changed to require a second, higher authorization level. In such a case, testing of the tested system 306 may provide an erroneous result, because the test entity associated with testing such transactions/documents may return a result that is allowable for a particular user to execute the specified transaction, when in fact the user may not have the newly-required authorization level needed to complete the transaction.

Switch attributes 328 may refer generally to any characteristic of the tested system 306 which may be switched (e.g., turned on or turned off) within the context of the tested system 306. For example, certain software may be associated with various versions, such as, e.g., a student version, a home user version, or a professional version. It may occur that all the versions are included with the same software, but that associated functionality is switched on or off for a particular user, or in a particular user environment. Similar attributes may exist with respect to hardware elements of the tested system 306, e.g., such as when a functionality such as Bluetooth or other optionally configured hardware functionality is enabled or disabled.

A final example of a source of change events which may be generated by the change event generator 320 is illustrated as including software components 330. As may be appreciated, such software components 330 may represent virtually any software application, object, script, or other component which may be installed within the tested system 306, and which may be subject to addition, deletion, or alteration.

Thus, FIG. 3 illustrates some specific, non-limiting example scenarios in which a change of a tested system subsequent to attribute collection during a previous testing of the tested system may be used to identify, in conjunction with the previously collected attributes, test entities which may be affected by the changes. In this way, test entities affected by the changes may be identified, and replaced, altered, or otherwise corrected, prior to a subsequent testing of the tested system 306. Consequently, a likelihood of receiving an error or other exception during the second testing is reduced, and a possibility of receiving erroneous results from the testing may also be reduced.

Further in the example of FIG. 3, a third party test management system 332 is illustrated as being able to communicate with the test management system 304, using corresponding API's 334. That is, it may occur that the test management system 304 is installed and/or operated by a software vendor which is responsible for providing software for the tested system 306. In such cases, for example, a third party may provide supplemental software which interacts with the software provided by the vendors of the test management system 304. In other examples, the third party test management system 332 may simply be a specialized or optimized test which is operable to execute particular software tests and/or to achieve particular levels of accuracy or completeness during the testing.

Thus, FIG. 3 illustrates that such third party test management system 332 also may benefit from the functionality of the test management system 304 and related functionality shown in FIG. 3 with respect to the testing system 306. For example, the third party test management system 332 may include various test entities and associated attributes, e.g., as may be retrieved from the API 314, as shown. Then, using the APIs 334, the third party test management system 332 may also be enabled to utilize grouped collected attribute sets in order to identify associated affected test entities within the third party test management system 332.

It may be appreciated that such functionality leverages, and is substantially similar to, functionality described above with respect to, e.g., the test entity 308 and test entity attributes 310-312. Consequently, further details of use of the third party test management system 332 is not provided herein.

Rather, one of skill in the art would appreciate that an operator of the system 300 may benefit from being able to identify potentially affected test entities associated with changes within a software environment, even when test management functionality is provided by, or in association with, a third party provider.

Figure 4:
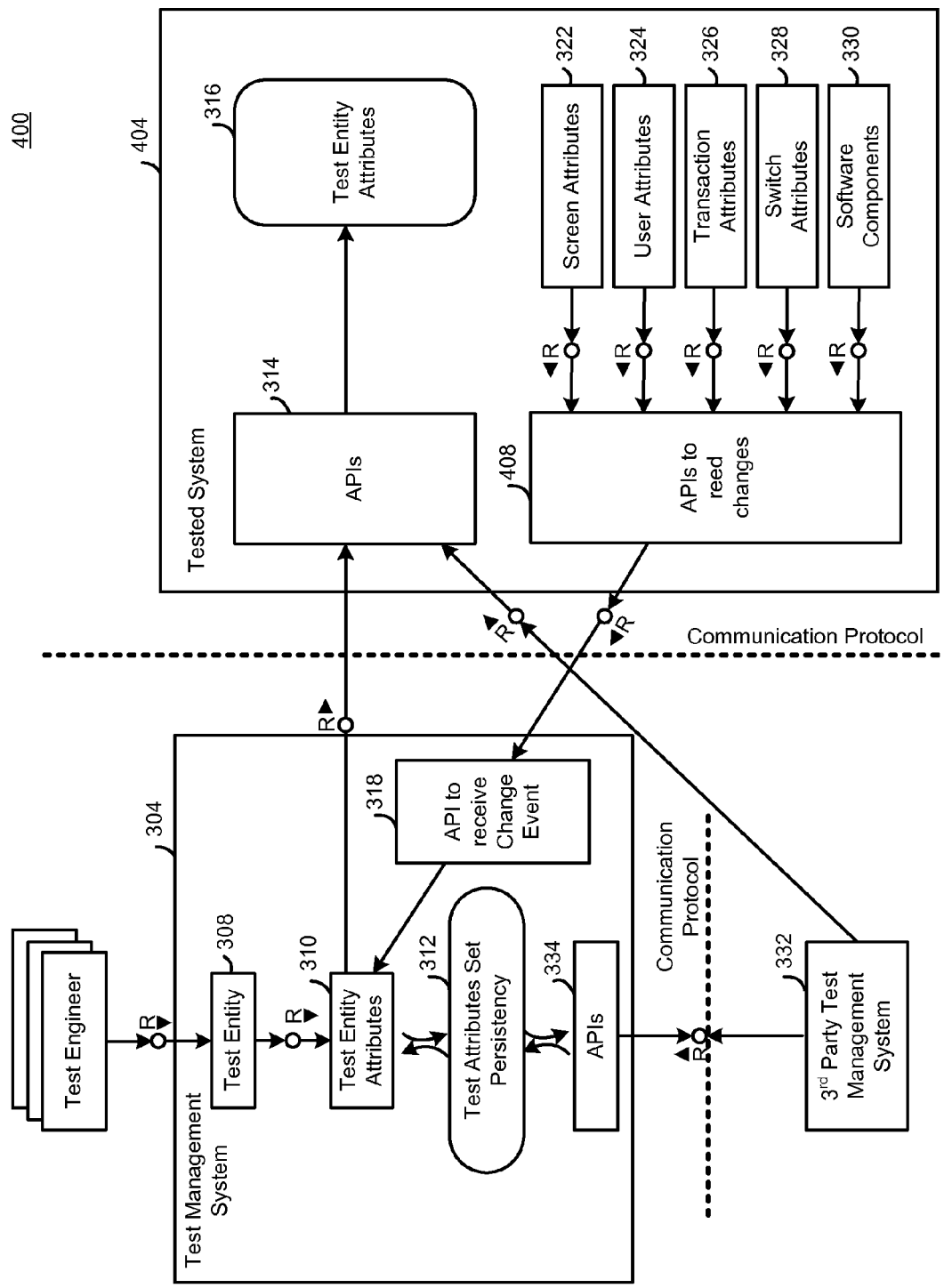
FIG. 4 is a block diagram of a system illustrating a second example implementation of the system of FIG. 1.

FIG. 4 is a block diagram of a system 400 illustrating a second example of implementation of the system 100 of FIG. 1. More specifically, as described above, the system 400 may correspond to scenarios in which the attribute analysis signal handler 126 includes the exception handler 128 and/or the change requestor 136.

In FIG. 4, it may be observed that like elements are illustrated with like numerals with respect to the example implementation of FIG. 3. On the other hand, in FIG. 4, a tested system 404 may be tested by the test management 402, each of which may include various additional or alternative elements as compared to the example scenario FIG. 3.

In particular, in FIG. 4, the test management system 402 includes a change identifier 406 which is in communication with APIs 408 to make changes within the tested system 404. In other words, as described above, an initial testing of the tested system 404 may execute the completion, using the APIs 314 in the attributes 316, in conjunction, of course, with associated test input data and test output data (not explicitly shown in FIG. 4), and analysis thereof. In conjunction with such testing, the attribute set 312 for corresponding test entity 308 may be collected and stored. At a subsequent time, a change within the tested system 404 may be retrieved therefrom. For example, during a second or subsequent testing of the tested system 404, an intervening change to the tested system 404 which occurred prior to the second testing may be collected as part of attribute collection of the second or other subsequent testing.

As described above, such changes may not be detected until if and when an actual exception occurs and during the second or other subsequent testing. In other examples, however, it may occur that the change identifier 404 requests an indication of such changes from the API 408, without necessarily waiting for such subsequent testing to begin and/or to reach an exception stage.

Figure 5:
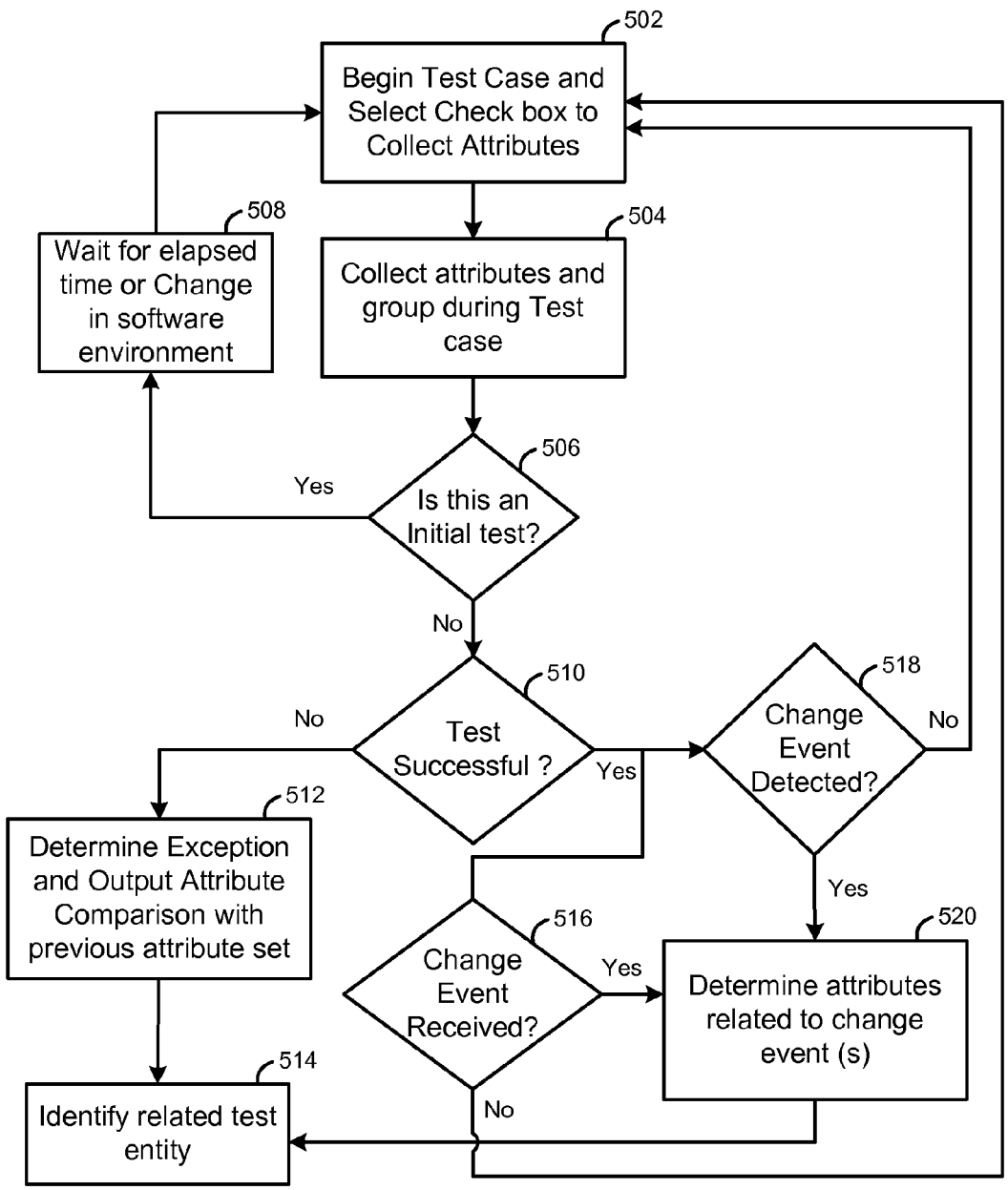
FIG. 5 is a flowchart illustrating example implementations which may be associated with one or more of the systems of FIGS. 1, 3, and 4.

FIG. 5 is a flowchart 500 illustrating example implementations which may be associated with one or more of the systems 100, 300, 400 of FIGS. 1, 3, 4. Specifically, in FIG. 5, it may occur that a test case is begun and that the test engineer selects a corresponding check box which indicates that the test management system should collect attributes of the software environment of the test system during the test case (502). Subsequently, during the test case, attributes may be collected and grouped (504). For example, the attribute collector 120 and the attribute aggregator 122 may be configured to execute such collection and grouping of relevant attributes.

If the test case in question is an initial test (506), where an initial test may refer either literally to a first test of a tested system, or to a test which is considered to be a baseline or representative example, then it may be appreciated that there will be no attribute set which may serve as a basis for comparison of either subsequent attributes, or of associated change events associated with the tested system. Consequently, the system may wait for a designated time to past, and/or until a change in the associated software environment is determined to occur (508). For example, a designated time may be set prior to execution of the operations of flowchart 500 and, additionally or alternatively, the system may be configured to retrieve or otherwise receive or determine changes in the associated software environment, as described above.

Then, the subsequent test case may be begun (502), during which grouped attributes may again be collected (504). In this case, such a subsequent test will not be an initial test (506) and the system may thus determine whether the test was successful (510).

If the test was not successful (510), then an exception may be determined and an attribute comparison may be output for comparison with a previous attribute set from the previously executed test case (512). Using such an attribute comparison, one or more related test entities may be identified (514). For example, such scenarios may correspond to the examples above with respect to FIG. 1, in which the exception handler 128 receives notification of an unsuccessful test as an example of the attribute analysis signal, whereupon the attribute comparator 130 may utilize the view generator 132 to output the attribute set comparison, while the entity identifier 132 also may be operable to identify the related, affected test entities associated with the attribute comparison.

If, however, the subsequent test was successful (510), then at least one of at least two possible outcomes may result. Specifically, as shown, in one example implementation, it may be determined at some point thereafter whether a change event was received (516), e.g., from the change event generator 320 of FIG. 3. If so, then attributes related to such change events may be determined (520). Similarly, at some point subsequent to a successful test (510), a change event may be detected (518), e.g., in response to a request from the test management system to the tested system in question. In this case, again, attributes related to the change event may be determined (520) so that, in either or both scenarios, the related, affected test entity may be identified (514).

On the other hand, when no change event is detected or received (518, 516), then, after a period of time, it may occur that a new test case is begun (502). In this case, further execution of the operations 502-520 of the flowchart 500 may proceed.

FIG. 5 is intended merely to illustrate certain non-limiting examples of operations that may be associated with the systems of FIGS. 1, 3, 4. Of course, other additional or alternative implementations may exist. For example, it may occur that after an initial test (506), and after an elapsed time and/or determination of a change in the software environment (508), operations may proceed directly with determining of a change event (516, 518), and subsequent determination of associated attributes (520) and ultimate identification of related, affected test entities (514).

Other embodiments and variations will be apparent to one of skill in the art. For example, FIG. 5 assumes that an initial test is conducted in the presence of a known software environment, and will therefore be successfully completed. However, it may occur that such an initial test is not completed successfully. In such case, it may be possible to determine associated attribute sets and corresponding test entities, e.g., by executing the method described herein with respect to a corresponding, separate test system. In other words, the various method described herein (e.g., comparison of attribute sets, and relationship of change events or other changes with attributes), may be executed using attributes or other information from tested systems within an overall network environment. For example, an IT professional in a corporate environment may identify affected test entities in a first tested system, using analogous attribute sets collected with respect to a separate but similar or analogous version of a tested system (e.g., an analogous software environment) within a corporate network environment of the IT professional.

Figure 6:
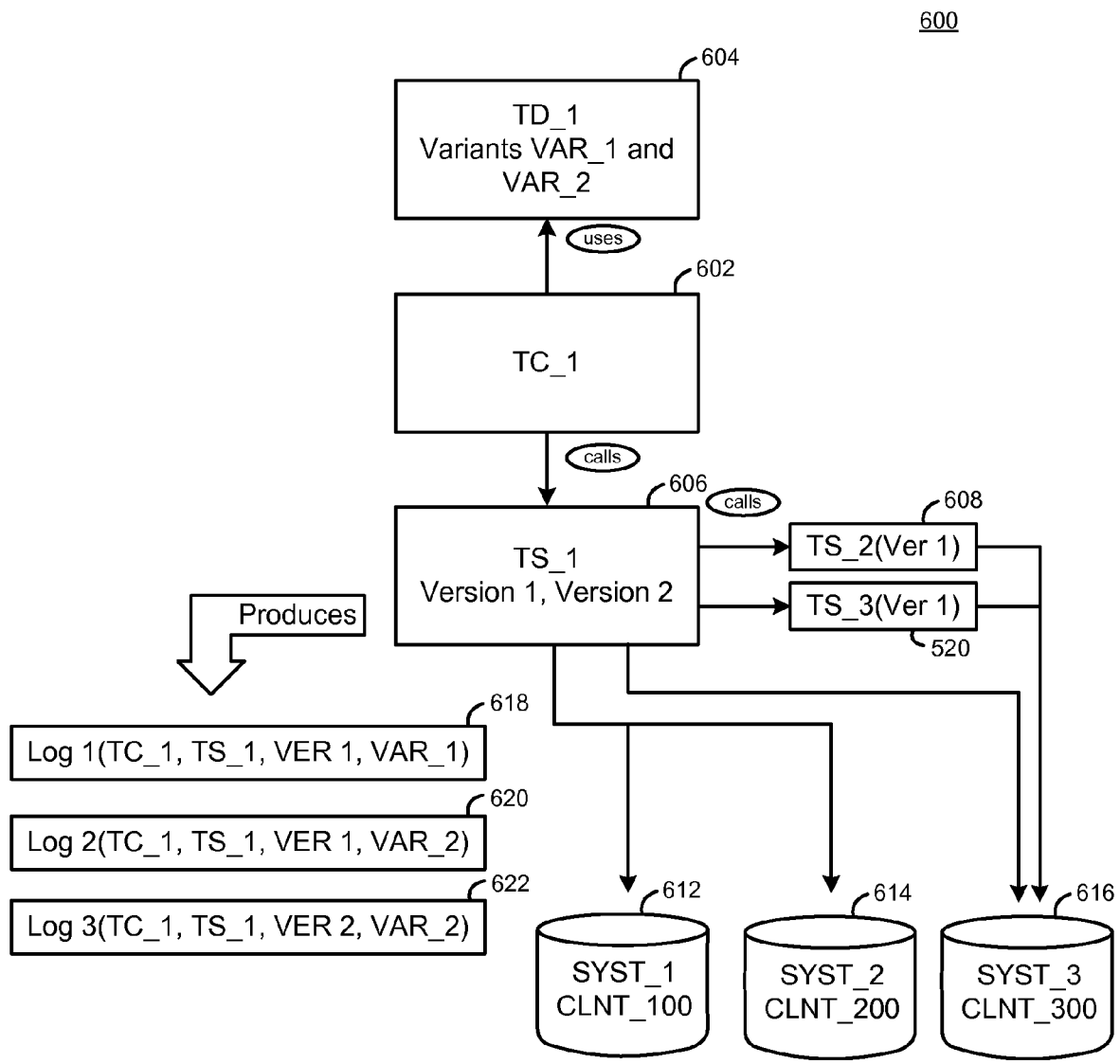
FIG. 6 is a block diagram illustrating example testing scenarios, including various test entities.

FIG. 6 is a block diagram 600 illustrating example testing scenarios, including various test entities. In the example of FIG. 6, a test configuration TC_1 602 is illustrated in using test data TD_1 604 for conducting a software test according to the testing script TS_1 606. In other words, the test configuration 602 generally defines an overall testing case or scenario in which the test data 604 as an example of the test input data 112 of FIG. 1, while the test script 606 defines specific instructions for using the test data 604 in testing various client/system environments.

As shown, the test data 604 may include a first variant (VAR_1), and a second variant (VAR_2). Similarly, the test script 606 includes a first version (version 1), and a second version (version 2). Consequently, it may be appreciated that various combinations of the variants and versions of the test data 604 and test script 606 may be selected according to the overall test configuration 602, in order to provide desired types of testing for one or more software environments.

Further, the test script 606 may be used by itself within a test configuration 602, or may call one or more other test scripts in order to provide different or additional testing within the same or different software environments. For example, as shown in FIG. 6, a second test script (TS_2 608) may be called by the test script 606, and, similarly, the test script 606 may call a third test script (TS_3 610).

As shown in the example of FIG. 6, the test script 606 may be applied individually against each of a pair of client systems 612, 614. Meanwhile, the test script 606 may be applied in conjunction with test scripts 608, 610 in conjunction with a third client system 616. More particularly, as shown, a first version of the test script 606 may be applied against the client system 612, 614, while a second version of the test script 606 may additionally call the test scripts 608, 610 for testing of the client system 616.

In the example, then, three different results for the 3 different testing scenarios of the test configuration 602 may be output, and, correspondingly, 3 different collections of attributes 616, 620, 622 also may be collected. Specific, as shown, a log 618 may include for the test configuration 602 and application of version 1 of the test script 606 using variation 1 of the test data 604. Meanwhile, a log 620 may include, for a test configuration 602, and the test script in version 1 of the test script 606, and an output relying on an input of variant 2 of the test data 604. Finally, in FIG. 6, a log 622 may include, for the test configuration 602 and version 2 of the test script 606, output based on variation 2 of the test data 604.

Thus, it may be appreciated that the test entities as discussed above with respect to FIGS. 1-5 may represent one or more of the various entities illustrated in FIG. 6, or combinations thereof. For example, an attribute set may be stored in association with the test script 606, and possibly including storage of an appropriate attribute set in conjunction with the further test script 608 and/or 610. Consequently, as described, such attribute sets may be correlated with such test entities in order to identify the test entities as being possibly affected by underlying changes to one or more of the software environments 612, 614 and/or 616.

Example relationship(s) between the entities Test Configuration, Test Script/Test Script Version, Test Data Container and Test Attributes Set are explained below. For example, in a relation between Test Configuration and Test Attributes Set, there may be at most one Test Attributes Set for a Test Configuration. The mapping between Test Configuration and Test Attributes Set may be kept in a mapping table. A Test Attributes Set may be available to only one Test Configuration. If a Test Configuration is deleted, the corresponding Test Attributes Set may also be deleted. If a Test Configuration is renamed, this will have no affect on the Test Attributes Set, and instead just the corresponding mapping table may be updated (described in more detail below with respect to FIG. 7). If a Test Configuration is copied, the Test Attributes Set need not be copied automatically, since a new test script or test data container can be assigned to the new copy of the Test Configuration.

In a relationship between Test Script/Test Script Version and a Test Attributes Set, when a Test Configuration is executed, it generally runs the Test Script assigned to it. The Test Script assigned to the Test Configuration can also call other Test Scripts, so a hierarchy of Test Script Calls can be the result of a Test Configuration Execution. A Test Attributes Set will contain the attributes for all the Test Scripts called in this call sequence. Thus, one Test Attributes Set can contain data for many Test Scripts(at different hierarchy levels) for each execution of a variant in Test Configuration.

In a relationship between a Test Data Container and a Test Attributes Set, there may not be an explicit assignment therebetween. Rather the variants of a Test Data Container can be used in a Test Configuration and a Test Configuration can be executed for these variants. Since the Test Attributes Set will contain the execution specific attributes per Test Script/Test Script Version/Variant ID combination, the assignment to Test Data Container need not be explicitly saved anywhere.

With reference again to FIG. 6, and also with reference to FIGS. 10-12 as explained in more detail below, for a Test Attributes Set for the Test Configuration TC_1 602, there may be one Test Attributes Set (e.g., named TSTAT_1) for this Test Configuration which may be represented by a GUID. The mapping between Test Configuration TC_1 602 and TSTAT_1 may be saved in a separate database table. The generic attributes of the Test Configuration TC_1 602 may be held in a database table which is directly assigned to the Test Configuration itself. The Test Attributes Set need only contain the execution related attributes.

Figure 11:
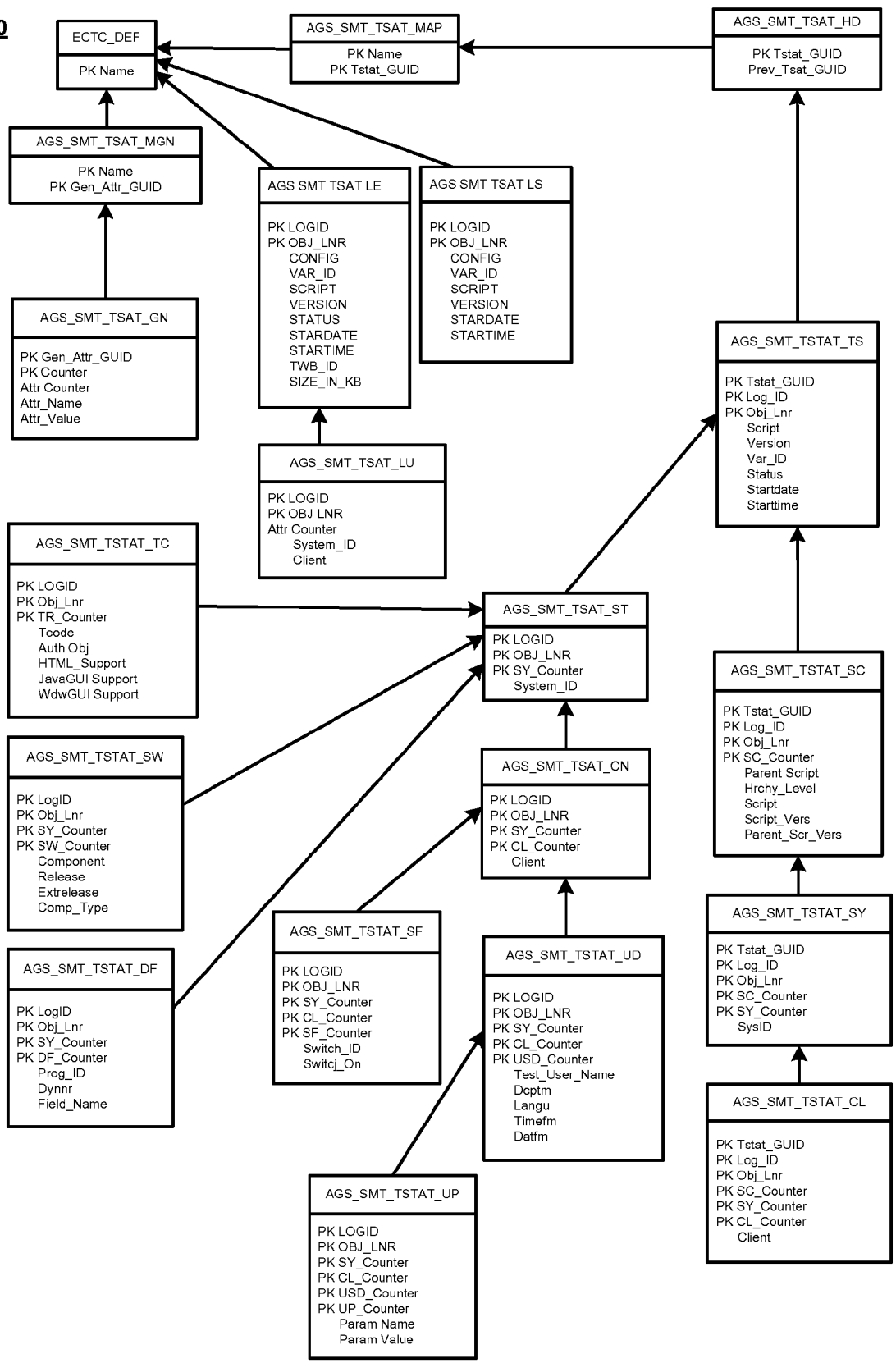
FIG. 11 is a block diagram illustrating database tables used in the system 100 of FIG. 1.

In this regard, the execution related test attributes may be saved in Test Attributes Set database tables (see, e.g., FIG. 11). The key for execution related attributes may be the combination Test Attributes Set GUID (which may serve as a proxy for Test Configuration Name), the name of a Top Level Test Script called in the Test Configuration, the version of the Top Level Test Script called in the Test Configuration and the Variant ID of the Test Configuration. The test attributes may thus be saved for all test scripts called from a top level test script, as well as the ones called by called test scripts recursively, in the form of a hierarchy table. The execution related test attributes also may be system and client specific. For example, in FIG. 6, the test attributes may be saved for each system/client combination, e.g., the test attributes may be saved for each System and Client for a specific associated identifier. The hierarchy of scripts called and the Test Attributes Set data saved for each System ID/Client ID combination may be independent of each other in order to hinder data redundancy in the database.

Figure 7:
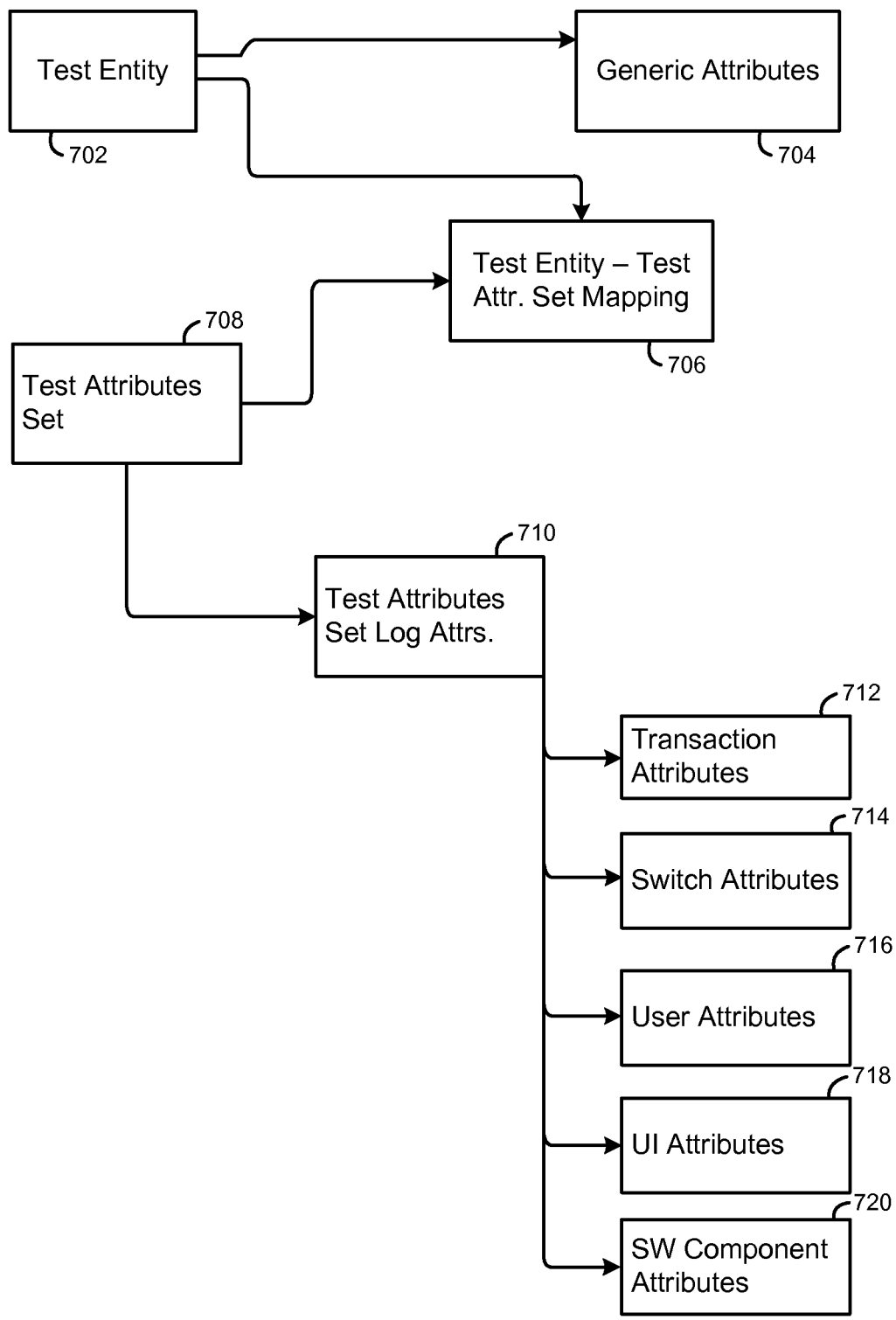
FIG. 7 is a diagram illustrating relationship between test entity and associated attributes.

FIG. 7 is a diagram 700 illustrating relationships between a test entity and associated attributes. Specifically, as shown, a test entity 702 may be related to generic attribute(s) 704 which are not considered to be part of the attribute set described herein for the purposes of the present description. Meanwhile, a mapping 706 between the test entity 702 and the test attribute set 708 may be used to provide a layer of independence between the test entity 702 and underlying associated attributes 712-720 within a test attribute set 710. That is, for example, the various attributes 712-720 of the test attribute 710 may be mapped or otherwise associated with the test entity 702, so that, e.g., if a test entity 702 is later changed, it is not necessary to update the related attributes 712-720. Rather, it is simply necessary to update the mapping 706 to relate the new name of the test entity 702 to the corresponding attributes 712-720.

Within the test attribute set 708, the example attributes 712-720 correspond generally to the various examples of software attributes already described above. Consequently, the example of FIG. 7 is merely intended to illustrate an example potential relationship between such attributes and their corresponding test entity, and to illustrate the potential inclusion of generic attributes 704 in conjunction with the test entity 702.

Figure 8:
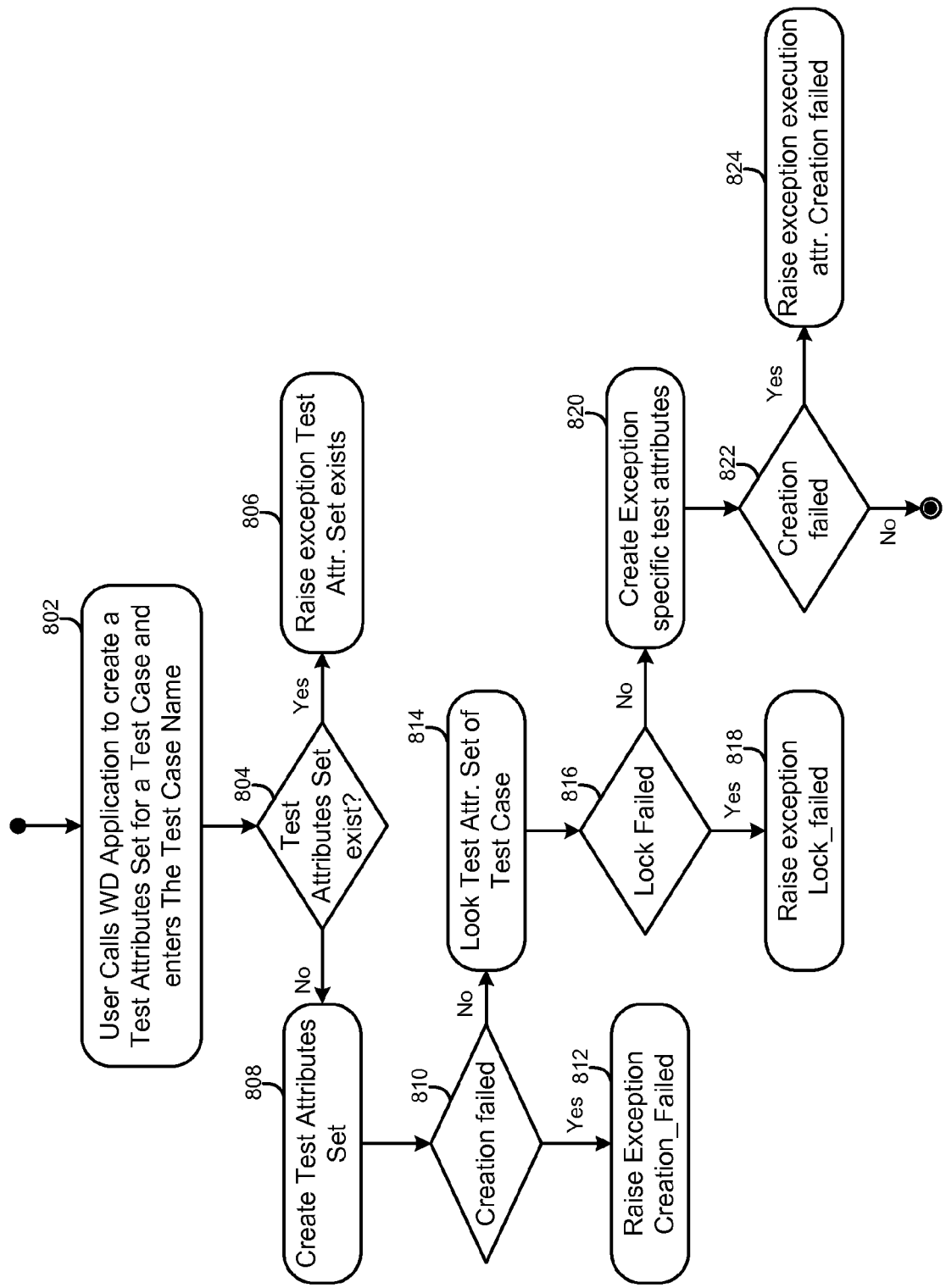
FIG. 8 illustrates a flowchart showing operations associated with a manual creation of an attribute set.

FIG. 8 illustrates a flowchart 800 showing operations associated with a manual creation of an attribute set. That is,if there is no Test Attributes Set in the system for a Test Case and a test user wants to enter, e.g., generic data for this test case, the user may call a designated application in order to create the Test Attributes Set. The same application also may give a test engineer the possibility to enter generic attributes for a Test Case.

Thus, as shown in FIG. 8, in creating an attribute set, a user may initially create the test attribute set for a specific test case in conjunction with entering a name of such a test case (802). If a corresponding test attribute set already exists (804), then an exception may be raised to provide an indication of such possible conflicts (806). If not (804), then the test attribute set may be created (808).

If the creation fails (810), then the corresponding exception may be raised (812). If not (810), then the test attribute set of the corresponding test case may be locked (814). If such a lock fails (816), then a corresponding exception for a lock failure may be raised (818). If not (816), then execution specific test attributes may be created (820). If such creation does not fail (822), then the process 800 may complete. On the other hand, if creation does fail (822), then corresponding exception for execution attribute creation failure may be raised (824).

Figure 9:
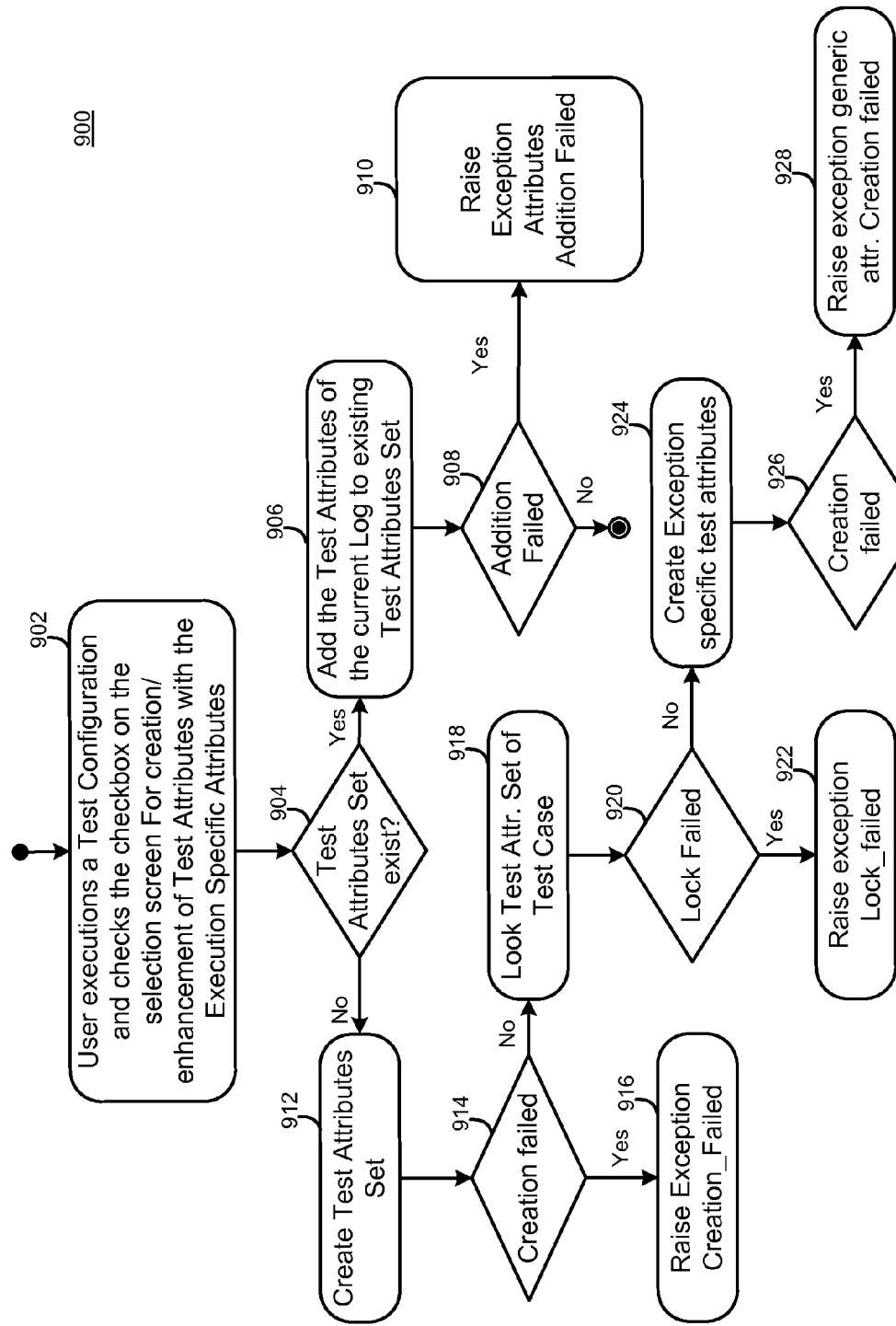
FIG. 9 is a flowchart illustrating example operations for automatic creation of a test attribute set.

FIG. 9 is a flowchart 900 illustrating example operations for automatic creation of a test attribute set. In the example of FIG. 9, a user executes a selected test configuration, and checks a corresponding check box on the selection screen for creation/enhancement of test attributes in conjunction with execution specific attributes (902). If such a test attribute set exists (904), then the test attributes of the current attribute log may be added to the existing test attributes set (906). If the addition failed (908), then a corresponding exception for failure of addition of the attributes may be raised (910).

If the test attribute set does not yet exist (904), then the test attribute set may be created (912). If creation fails (914), then a corresponding exception for the creation failure may be raised (916). If the creation does not fail (914), then creation may proceed with locking of the test attribute set of the test case (918). If such lock fails (920), then the corresponding exception for the lock failure may be raised (922). If not (920), then the execution specific test attributes may be created (924). If the creation does not fail (926), then the process 900 may complete a process of creation, however, if it does fail (926), then a corresponding exception for failure of the creation of the attribute set may be raised (928).

Figure 10:
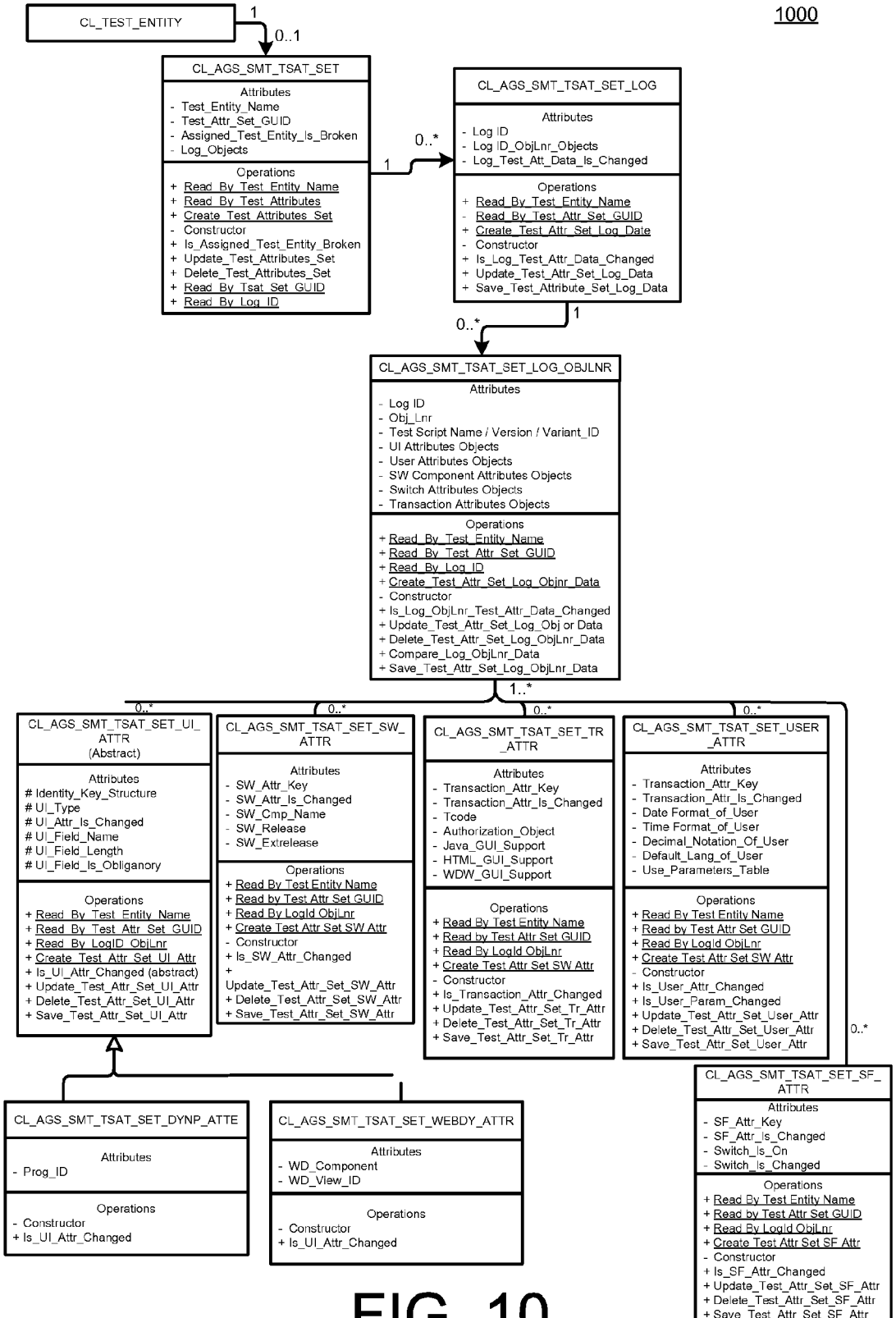
FIG. 10 is a class diagram for implementing test attribute sets in the context of the system 100 of FIG. 1.

FIG. 10 is a class diagram 1000 for implementing test attribute sets in the context of the system 100 of FIG. 1. In FIG. 10, the class model of the Test Attributes Set shows the relationship between different entities of a Test Attributes Set. The classes in the class diagram constitute the Business Object and Application Layer of a Test Attributes Set, and abstracts the data model of the Test Attributes Set. These classes may be called from client applications and remote enabled APIs to create/read/update/delete the Test Attributes Set and its corresponding data. The classes also contain methods which can be called to compare Test Attributes Set data or detect if a Test Entity assigned to a Test Attributes Set is broken.

FIG. 11 is a block diagram illustrating database tables 1100 used in the system 100 of FIG. 1. More specifically, FIG. 11 illustrates the relationship between the database tables which will hold the data for Test Attributes Set. As can be seen from the relationship between database tables, and as described herein, generic attributes can be directly assigned to a Test Case. The mapping table between Test Case and Test Attribute Set assigned to it permits renaming of the Test Case, independently of the Test Attribute Set assigned to it. Statistical data about a Test Case, e.g., a number of runs or the information about the last successful run, may be saved independently of the Test Attributes Set. The Test Attributes Set data may be saved in the form of a hierarchical tree for all the scripts called in a Test Case, regardless of their place in the call hierarchy.

Finally, the Test Attributes Set data may include two paths of data. The first one is the hierachical structure of the scipts called in a Test Case, and the list of systems and clients on which these scripts are called. The second path of data includes the test attributes generated for objects such as, e.g., screens, transactions, and switches, and these data are independent of the script call hierarchy, but dependent on the systems/clients for which the scripts are called.

Figure 12:
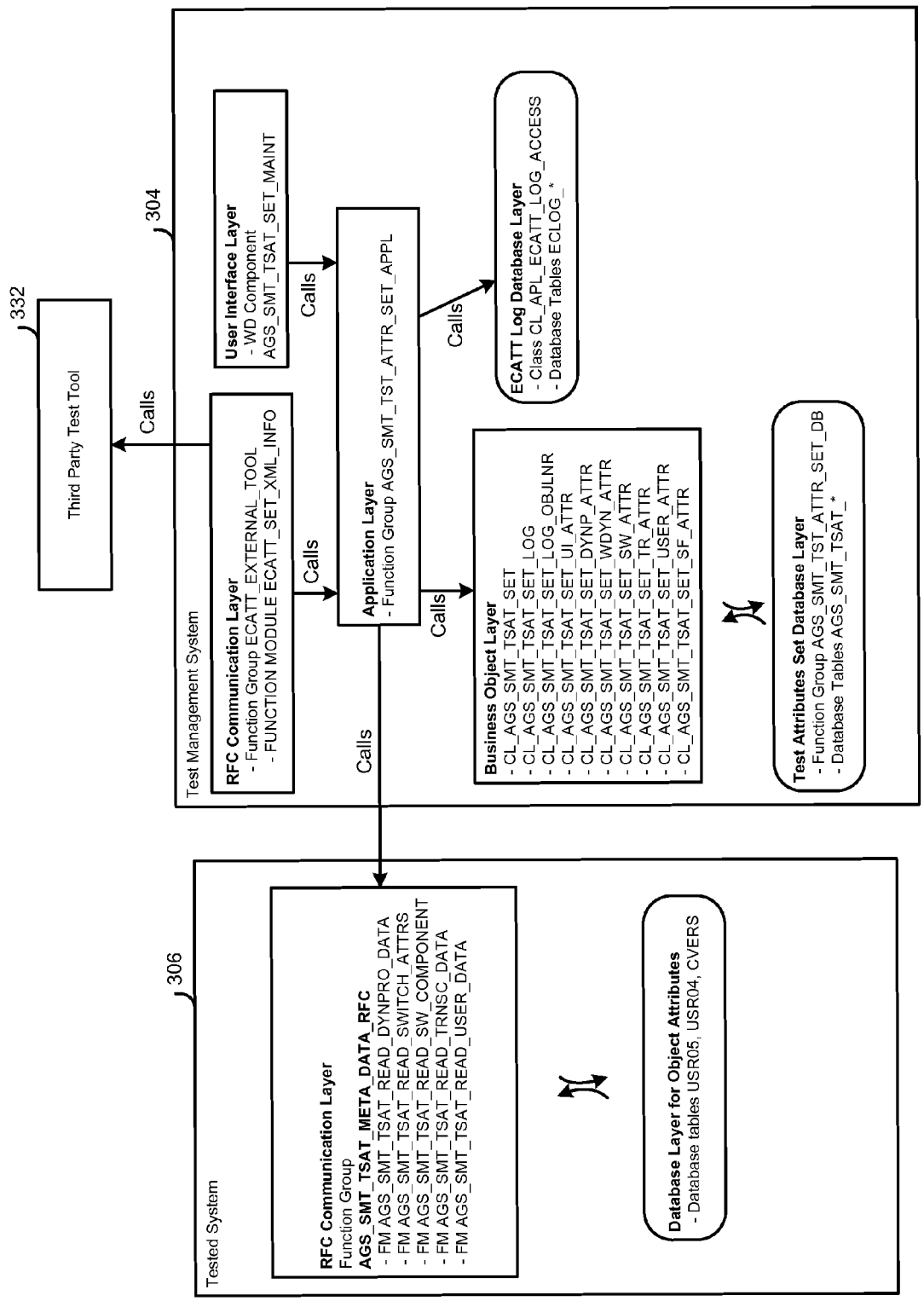
FIG. 12 is a block diagram of an example architectural implementation of the system 100 of FIG. 1.

FIG. 12 is a block diagram of an example architectural implementation of the system 100 of FIG. 1, corresponding at least in part to the block diagrams of FIGS. 3 and/or 4. As may be appreciated from the above description, and observed in FIG. 12, the architecture may include three primary building blocks. The first block includes the persistency layer and APIs for Test Attributes Set. The persistency layer is represented by database table of which name start with the prefix AGS_SMT_TSTAT_ and the function group AGS_SMT_TEST_ATTR_SET_DB. The second block will fetch the Test Attributes Set relevant data from available logs and add these attributes to Test Attributes Set data. The function modules of function group AGS_SMT_TEST_ATTR_SET_APPL and the class CL_APL_ECATT_LOG_ACCESS belong to this second block. The third block includes the User Interface layer which will be used to create/delete/change/compare Test Attributes Set data. Different GUI applications will be created in this component for the functionalities listed. The third party test tool 332 can also create Test Attributes Set via the RFC enabled function module ECATT_SET_XML_INFO and setting the XML String type to 'METADATA'. If the third party test tools provide additional test attributes, the data model of the Test Attributes Set may be enhanced with these attributes.

The following includes a number of example detailed descriptions of function modules and/or methods of classes that may be used in the system 100 of FIG. 1, and which may be understood, in pertinent part, with respect to FIGS. 10-12. In the following, and in FIGS. 10-12, several references are made to the proprietary web application user interface technology known as Web Dynpro; however, it may be appreciated that the use of such technology represents merely one non-limiting example, and that other user interface technology may be used, as well.

Function Group ECATT_EXTERNAL_TOOL: This function group is a placeholder for the function modules which gives the third party test tools access.

Function Module ECATT_SET_XML_INFO: Input may include an Object List for which Test Attributes must be read from Tested Systems, and Information Type(e.g., the test attributes). This function module may create a test attributes set when it is called from a third party test tool. The function module will receive a list of objects for which attributes must be generated and will call the function modules of function group AGS_SMT_TSAT_METADATA_RFC in the tested systems for reading the attributes of objects and saving them in the persistency layer.

Function Group AGS_SMT_TEST_ATTR_SET_DB: this function group may hold one Update Enabled function module for saving the Test Attributes Set data to the database tables. The other operations related to Test Attributes Set entities may be programmed in the corresponding Business Object classes for these entities as shown in the class diagram of FIG. 10.

Function Module AGS_SMT_SAVE_TEST_ATTR_SETS_UPD_DB: Input may include Test Attributes Set header data, List of executions of a Test Configuration, a list of systems on which a test is executed, a list of user defaults data, list of user parameters, a list of switch data, a list of test script data, a list of transaction data, and a list of GUI data. This update enabled function module may be used to save the test attributes set data to the database Function Group AGS_SMT_TSAT_METADATA_RFC may include the following function modules.

Function Module AGS_SMT_TSAT_READ_DYNPRO_DATA for reading GUI attributes from remote systems, with Input
    List of GUIs
Output
    List of attributes of GUIs Function Module AGS_SMT_TSAT_READ_SWITCH_ATTRS, which read switch attributes from remote systems, with Input
    List of Switches
Output
    List of attributes of switches Function Module AGS_SMT_TSAT_READ_SW_COMPONENT, which reads the software component attributes from a remote system, with Output
    List of attributes of software components of a remote system Function Module AGS_SMT_TSAT_READ_TRNSC_DATA, which reads the transaction attributes from a remote system, with Input
    List of transaction codes
Output
    List of attributes of transactions Function Module AGS_SMT_TSAT_READ_USER_DATA, which reads the user parameters and user defaults from a remote system, with

```
        Input
            List of user names
        Output
            List of user defaults
            List of user parameters
```

Function Group AGS_SMT_TEST_ATTR_SET_APPL may include the following function modules.

Function Module AGS_SMT_GENERATE_TEST_ATTR_SET, which generates a test attributes set using the data in the corresponding log given as input, e.g.,

```
        Input
            List of relevant test cases
            Log ID                        Optional
            List of GUIs                  Optional
            List of Switches              Optional
            List of Users                 Optional
            List of Transactions          Optional
            List of Software Components   Optional
```

Function Module AGS_SMT_TSAT_COMPARE_TEST_ATTR, which compares the test attributes set data of two logs given for a specific test script, with

```
        Input
            First Ecatt Log ID
            Second Ecatt Log ID
            Test Script for which data must be compared
        Output
            Comparison Results
```

Meanwhile, Class CL_AGS_SMT_TSAT_SET is a class which includes the Business Object Layer class which represents a Test Attributes Set. The class may be a container for the Create/Update/Read/Delete methods of a Test Attributes Set and also may hold methods for checking if the test entity assigned to a Test Attributes Set is broken (or likely broken), depending on the changes in the objects for which attributes are saved as Test Attributes. The methods of this class will be as below:

```
Method READ_BY_TEST_ENTITY_NAME
    Input
        Test Case Name
    Output
        An instance of class CL_AGS_SMT_TSAT_SET or empty
        reference
```

Thus, this method returns an instance of the Test Attributes Set class if there is already a test attributes set for the Test Case given. If not, an empty reference is returned to the caller.

The following method returns instances of the Test Attributes Set class if there is already a test attributes set for the Test Attributes given. If not, an empty reference is returned to the caller. This method can be especially useful for the publish/push methodologies described above for detecting affected test entties. Given a list of changed test attributes, all the test attribute sets in which the changed attributes are saved can be checked, and it may be checked whether the Test Case assigned to the Test Attributes Set is broken:

```
        Method READ_BY_TEST_ATTRIBUTES
            Input
                Test Attributes( Dynpros, Switches etc. )
            Output
                List of instances of class CL_AGS_SMT_TSAT_SET
```

The following method returns an instance of the Test Attributes Set class if there is already a test attributes set for the GUID given. If not, an empty reference is returned to the caller.

```
        Method READ_BY_TSAT_GUID
            Input
                Test Attributes Set GUID
            Output
                An instance of class CL_AGS_SMT_TSAT_SET
                or empty reference
```

The following method returns instances of the Test Attributes Set class if there is already a test attributes set for the log id given.

```
        Method READ_BY_LOG_ID
            Input
                Log ID
            Output
                List of instances of class CL_AGS_SMT_TSAT_SET
```

The following method is a factory method for creating an instance of the Test Attributes Set and other sub-objects belonging to the Test Attributes Set

```
        Method CREATE_TEST_ATTRIBUTES_SET
            Input
                Test Case Name
                Dynpro Attributes
                Switch Attributes
                User Attributes
                Transaction Attributes
                Software Component Attributes
            Output
                Created instance of class CL_AGS_SMT_TSAT_SET
```

The following private constructor of the class creates an instance of the class CL_AGS_SMT_TSAT_SET

```
            Method CONSTRUCTOR
                Input
                    Test Case Name
                    Dynpro Attributes
                    Switch Attributes
                    User Attributes
                    Transaction Attributes
                    Software Component Attributes
```

The following method compares the list of changes given with the attributes saved in a database in order to find out if the Test Case assigned to the Test Attributes Set is (already) broken.

```
Method IS_ASSIGNED_TEST_ENTITY_BROKEN
    Input
        Dynpro Attributes Changes
        Switch Attributes    Changes
        User Attributes      Changes
        Transaction Attributes Changes
        Software Component Attributes Changes
    Output
        Flag showing if the test entity is broken or not
```

The following method saves the changes made to the Test Attributes Set to the database.

```
Method SAVE_TEST_ATTRIBUTES_SET
    Input
        Test Case Name
        Dynpro Attributes
        Switch Attributes
        User Attributes
        Transaction Attributes
        Software Component Attributes
```

The class CL_AGS_SMT_TSAT_SET_LOG_OBJLNR is the Business Object Layer class which represents test attributes data for a specific Test Configuration/Test Script/Version/Variant ID at a specific position of a Log. The class may be a container for the Create/Update/Read/Delete methods and comparison method(s) for the Test Configuration/Test Script/Version/Variant ID combination given, as described above.

In this class, the following method returns a list of instances of the business object layer class for a given Log ID.

```
Method READ_BY_LOG_ID
    Input
        Log ID
    Output
        List of instances of class
            CL_AGS_SMT_TSAT_SET _LOG_OBJLNR
```

The following method returns a list of business object layer classes for a given Test Case Name.

```
Method READ_BY_TEST_ENTITY_NAME
    Input
        Test Case Name
    Output
        List of instances of class
            CL_AGS_SMT_TSAT_SET_LOG_OBJLNR
```

The following method returns a list of business object layer classes for a given Test Attributes Set GUID.

```
Method READ_BY_TSAT_GUID
    Input
        Test Attribute_Set_GUID
    Output
        List of instances of class
            CL_AGS_SMT_TSAT_SET_LOG_OBJLNR
```

The following method creates an instance of the class and returns the reference to the caller.

```
Method CREATE_TEST_ATTR_SET_LOG_OBJLNR
    Input
        Log ID
        Obj Lnr
        Dynpro Attributes
        Switch Attributes
        User Attributes
        Transaction Attributes
        Software Component Attributes
    Output
        An instance of CL_AGS_SMT_TSAT_SET_OBJLNR
```

The following private constructor creates an instance of the class:

```
Method CONSTRUCTOR
    Input
        Log ID
        Obj Lnr
        Dynpro Attributes
        Switch Attributes
        User Attributes
        Transaction attributes
        Software Component Attributes
```

The following method receives a reference to the business object class and compares the test attributes set data given in the reference taken with the test attributes set data of the current instance.

```
Method IS_LOG_OBJLNR_TEST_DATA_CHANGED
    Input
        Dynpro Attributes
        Switch Attributes
        User Attributes
        Transaction attributes
        Software Component Attributes
    Output
        List of instances of class CL_AGS_SMT_TSAT_SET_OBJLNR
```

The following method provides a list of differences in specified test attributes.

```
Method COMPARE_LOG_OBJLNR_DATA
    Input
        IO_LOG_OBJLNR Type ref to
            CL_AGS_SMT_TSAT_SET_LOG_OBJLNR
    Output
        List of differences in the test attributes
```

The following method provides persistence of attribute set(s).

```
Method SAVE_TEST_ATTR_SET_LOG_OBJLNR
    Input
        Test Case Name
        Log ID
        Obj Lnr
        Dynpro Attributes
        Switch Attributes
        User Attributes
        Transaction Attributes
        Software Component Attributes
```

The class Class CL_AGS_SMT_TSAT_SET_UI_ATTR may represent the abstract Business Object Layer class which represents attributes of a User Interface Element called in a Test. This class represents all user interface elements regardless of in which technology they are programmed.

The following method returns a list of instances of the business object layer class for a given Test Case Name. All UI attributes belonging to a Test Case are represented by the list of object instances returned to the caller.

```
Method READ_BY_TEST_ENTITY_NAME
    Input
        Test Case Name
    Output
        List of instances of class
            CL_AGS_SMT_TSAT_SET_UI_ATTR
```

The following method returns a list of business object layer classes for a given Test Attributes Set GUID. All UI attributes may belong to a Test Attributes Set GUID.

```
Method READ_BY_TSAT_GUID
    Input
        Test Attribute_Set_GUID
    Output
        List of instances of class
            CL_AGS_SMT_TSAT_SET_UI_ATTR
```

The following method returns a list of business object layer classes for a given Log ID/Obj Lnr combination.

```
Method READ_BY_LOGID_OBJLNR
    Input
        Log ID
        Obj Lnr
    Output
        List of instances of class CL_AGS_SMT_TSAT_SET_UI_ATTR
```

The following method creates an instance of the UI attribute class.

```
Method CREATE_TEST_ATTR_SET_UI_ATTR
    Input
        Log ID
        Obj Lnr
    Output
        List of instances of class CL_AGS_SMT_TSAT_SET_UI_ATTR
```

The following method creates a flag showing whether a UI attribute has been changed.

```
Method IS_UI_ATTR_CHANGED
    Input
        Field Name
        Field Length
        Field is obligatory flag
    Output
        Flag showing if the ui attribute is changed or not
```

The following method shows UI field names and characteristics.

```
Method SAVE_TEST_ATTR_SET_UI_ATTR
    Input
        Field Name
        Field Length
        Field is obligatory flag
```

The class Class CL_AGS_SMT_TSAT_SET_DYNP_ATTR inherits from the abstract class CL_AGS_SMT_TSAT_SET_UI_ATTR and represents the attributes of a Dynpro screen.

The class Class CL_AGS_SMT_TSAT_SET_WEBDY_ATTR inherits from the abstract class CL_AGS_SMT_TSAT_SET_UI_ATTR and represents the attributes of a Web Dynpro screen.

The class Class CL_AGS_SMT_TSAT_SET_SW_ATTR represents the software component attributes of a Test Attributes Set.

In this class, the following method returns a list of instances of the business object layer class for a given Test Case Name. All Software Component attributes belonging to a Test Case are represented by the list of object instances returned to the caller.

```
Method READ_ BY_TEST_ENTITY_NAME
    Input
        Test Case Name
    Output
        List of instances of class CL_AGS_SMT_TSAT_SET_SW_ATTR
```

The following method returns a list of business object layer classes for a given Test Attributes Set GUID. All Software Component attributes belonging to a Test Attributes Set GUID are returned to the user.

```
Method READ_BY_TSAT__GUID
    Input
        Test Attribute_Set_GUID
    Output
        List of instances of class CL_AGS_SMT_TSAT_SET_SW_ATTR
```

The following method returns a list of business object layer classes for a given Log ID/Obj Lnr combination.

```
Method READ_BY_LOGID_OBJLNR
    Input
        Log ID
        Obj Lnr
    Output
        List of instances of class CL_AGS_SMT_TSAT_SET_SW_ATTR
```

The following method creates an instance of the test attributes set software component attributes class and returns it to the user.

```
Method CREATE_TEST_ATTR_SET_SW_ATTR
    Input
        Software Component Name
        Software Component Type
        Release
        Extrelease
    Output
        A reference of class CL_AGS_SMT_TSAT_SET_SW_ATTR
```

The following private constructor creates an instance of the Software Components class.

```
Method Constructor
    Input
        Test Case Name
        Log ID
        Obj Lnr
        Software Component Name
        Software Component Type
        Release
        Extrelease
```

The class Class CL_AGS_SMT_TSAT_SET_USER_ATTR is the abstract Business Object Layer class which represents attributes of a Test User.

In this class, the following method returns a list of instances of the business object layer class for a given Test Case Name. All User attributes belonging to a Test Case are represented by the list of object instances returned to the caller.

```
Method READ_BY_TEST_ENTITY_NAME
    Input
        Test Case Name
    Output
        List of instances of class CL_AGS_SMT_TSAT_SET_USER_ATTR
```

The following method returns a list of business object layer classes for a given Test Attributes Set GUID. All Test User attributes belonging to a Test Attributes Set GUID are returned to the user.

```
Method READ_BY_TSAT__GUID
    Input
        Test Attribute_Set_GUID
    Output
        List of instances of class CL_AGS_SMT_TSAT_SET_USER_ATTR
```

The following method returns a list of business object layer classes for a given Log ID/Obj Lnr combination.

```
Method READ_BY_LOGID_OBJLNR
    Input
        Log ID
        Obj Lnr
    Output
        List of instances of class CL_AGS_SMT_TSAT_SET_USER_ATTR
```

The following method creates an instance of the test attributes set user attributes class and returns it to the user.

```
Method CREATE_TEST_ATTR_SET_USER_ATTR
    Input
        User_Defaults
        User_Parameters
    Output
        A reference of class CL_AGS_SMT_TSAT_SET_USER_ATTR
```

The following private constructor creates an instance of the Test User Attributes Class.

```
Method Constructor
    Input
        Test Case Name
        Log ID
        Obj Lnr
        User Defaults
        User Parameters
```

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable storage medium and readable by at least one processor, the system comprising:
   an attribute collector configured to cause the at least one processor to collect an attribute set for each test entity of a plurality of test entities, the attribute sets being included in outputs of a first instance of a software test testing functionality of a software application and executed in a software environment;
   an attribute analysis signal handler configured to cause the at least one processor to receive an attribute analysis signal associated with a change in the software environment, the change causing an incompatibility with an affected test entity of the plurality of test entities; and
   a view generator configured to cause the at least one processor to provide an attribute-based view associated with an affected attribute set associated with the change, the attribute-based view providing the affected attribute set as being included in outputs of a second instance of the software test testing the functionality of the software application and executed in the software environment, and thereby identifying the affected test entity as requiring an update to maintain compatibility with the software environment after the change,
   wherein the change is associated with a software object within the software environment for which attributes are collected, and wherein the system includes an attribute comparator configured to provide a comparison of the affected attribute set with the attributes collected for the software object and included in a corresponding attribute set of the attribute sets.

2. The system of claim 1 wherein the attribute collector comprises an attribute aggregator configured to group collected attributes into the attribute sets based on a relation of each collected attribute to a corresponding test entity of the plurality of test entities.

3. The system of claim 1 wherein the change includes a modification and/or addition to the software object within the software environment.

4. The system of claim 1 wherein the attribute analysis signal includes a notification of an exception which occurs during a subsequent software test associated with the software environment.

5. The system of claim 1 wherein the attribute analysis signal includes a published change event received from the software environment subsequently to completion of the software test.

6. The system of claim 1 wherein the attribute analysis signal includes a requested change event which is received by the attribute collector in response to a query of the software environment by the attribute analysis signal handler.

7. The system of claim 1 wherein the attribute-based view includes an identification of the affected test entity.

8. The system of claim 1 comprising an application program interface configured to communicate with an external test management system conducting the software test in the software environment, to thereby identify the affected test entity within the external test management system.

9. The system of claim 1 wherein the test entities include testing instructions for testing corresponding software objects within the software environment.

10. The system of claim 1 comprising an entity identifier configured to receive the comparison and to identify the affected test entity based thereon.

11. A computer system including instructions recorded on a non-transitory computer-readable storage medium and readable by at least one processor, the system comprising:
    an attribute collector configured to cause the at least one processor to collect an attribute set for each test entity of a plurality of test entities, the attribute sets being included in outputs of a first instance of a software test testing functionality of a software application and executed in a software environment;
    an attribute analysis signal handler configured to cause the at least one processor to receive an attribute analysis signal associated with a change in the software environment, the change causing an incompatibility with an affected test entity of the plurality of test entities; and
    a view generator configured to cause the at least one processor to provide an attribute-based view associated with an affected attribute set associated with the change, the attribute-based view providing the affected attribute set as being included in outputs of a second instance of the software test testing the functionality of the software application and executed in the software environment, and thereby identifying the affected test entity as requiring an update to maintain compatibility with the software environment after the change,
    wherein the change is associated with a software object of the software application within the software environment for which attributes are collected, and wherein the system includes an attribute comparator configured to provide a comparison of the affected attribute set with the attributes collected for the software object and included in a corresponding attribute set of the attribute sets,
    the system further including an entity identifier configured to receive the comparison and to identify the affected test entity based thereon.

12. A computer-implemented method for causing at least one processor to execute instructions recorded on a computer-readable storage medium, the method comprising:
    collecting an attribute set for each test entity of a plurality of test entities, the attribute sets being included in outputs of a first instance of a software test testing functionality of a software application and executed in a software environment;
    receiving an attribute analysis signal associated with a change in the software environment, the change causing an incompatibility with an affected test entity of the plurality of test entities; and
    providing an attribute-based view associated with an affected attribute set associated with the change, the attribute-based view providing the affected attribute set as being included in outputs of a second instance of the software test testing the functionality of the software application and executed in the software environment, and thereby identifying the affected test entity as requiring an update to maintain compatibility with the software environment after the change, wherein the change is associated with a software object within the software environment for which attributes are collected, and wherein receiving the attribute analysis signal associated with the change comprises providing a comparison of the affected attribute set with the attributes collected for the software object and included in a corresponding attribute set of the attribute sets.

13. The method of claim 12 wherein collecting the attribute set for each test entity of a plurality of test entities associated with a software test executed in a software environment comprises:

grouping collected attributes into the attribute sets based on a relation of each collected attribute to a corresponding test entity of the plurality of test entities.

14. A computer-implemented method for causing at least one processor to execute instructions recorded on a computer-readable storage medium, the method comprising:

collecting an attribute set for each test entity of a plurality of test entities, the attribute sets being included in outputs of a first instance of a software test testing functionality of a software application and executed in a software environment;

receiving an attribute analysis signal associated with a change in the software environment; and providing an attribute-based view associated with an affected attribute set associated with the change, the attribute-based view providing the affected attribute set as being included in outputs of a second instance of the software test testing the functionality of the software application and executed in the software environment, and thereby identifying an affected test entity that is affected by the change, wherein the change is associated with a software object within the software environment for which attributes are collected, and wherein receiving the attribute analysis signal associated with the change comprises providing a comparison of the affected attribute set with the attributes collected for the software object and included in a corresponding attribute set of the attribute sets, the method further including receiving the comparison and identifying the affected test entity based thereon.

15. A computer program product, the computer program product being tangibly embodied on a non-transitory computer-readable storage medium and comprising instructions that, when executed, are configured to cause at least one processor to:

collect an attribute set for each test entity of a plurality of test entities, the attribute sets being included in outputs of a first instance of a software test testing functionality of a software application and executed in a software environment;

receive an attribute analysis signal associated with a change in the software environment, the change causing an incompatibility with an affected test entity of the plurality of test entities; and provide an attribute-based view associated with an affected attribute set associated with the change, the attribute-based view providing the affected attribute set as being included in outputs of a second instance of the software test testing the functionality of the software application and executed in the software environment, and thereby identifying the affected test entity as requiring an update to maintain compatibility with the software environment after the change, wherein the change is associated with a software object within the software environment for which attributes are collected, and wherein the attribute-based view is based on a comparison of the affected attribute set with the attributes collected for the software object and included in a corresponding attribute set of the attribute sets.

16. The computer program product of claim 15 wherein the test entities include testing instructions for testing corresponding software objects within the software environment.

17. The computer program product of claim 15 wherein the instructions, when executed, are further configured to cause the at least one processor to receive the comparison and to identify the affected test entity based thereon.

* * * * *